(12) United States Patent
Terada et al.

(10) Patent No.: US 7,964,312 B2
(45) Date of Patent: Jun. 21, 2011

(54) FASTENER, CELL STACK, FUEL CELL DEVICE, AND ELECTRONIC DEVICE

(75) Inventors: Toshihito Terada, Hamura (JP); Hiroyasu Bitoh, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 810 days.

(21) Appl. No.: 11/936,910

(22) Filed: Nov. 8, 2007

(65) Prior Publication Data

US 2008/0113235 A1    May 15, 2008

(30) Foreign Application Priority Data

Nov. 10, 2006   (JP) .................................. 2006-304893

(51) Int. Cl.
*H01M 8/02* (2006.01)
*H01M 8/04* (2006.01)

(52) U.S. Cl. ...................... 429/413; 429/469
(58) Field of Classification Search .................. 429/413, 429/454, 469
See application file for complete search history.

(56) References Cited

U.S. PATENT DOCUMENTS

| | | | |
|---|---|---|---|
| 4,225,654 A * | 9/1980 | Tajima et al. ................. | 429/454 |
| 6,001,502 A * | 12/1999 | Walsh ........................... | 429/465 |
| 6,428,921 B1 * | 8/2002 | Grot .............................. | 429/470 |
| 6,653,006 B2 * | 11/2003 | Berlowitz et al. ............. | 429/420 |
| 6,874,588 B2 * | 4/2005 | Kato et al. ..................... | 429/413 |
| 2002/0172852 A1 * | 11/2002 | Frank et al. ..................... | 429/34 |
| 2003/0203265 A1 * | 10/2003 | Chen et al. ...................... | 429/32 |
| 2004/0096724 A1 | 5/2004 | Debe et al. | |
| 2005/0170225 A1 | 8/2005 | Okazaki | |
| 2006/0204815 A1 * | 9/2006 | Lam ................................ | 429/34 |
| 2006/0204823 A1 * | 9/2006 | Mazza et al. .................... | 429/38 |

FOREIGN PATENT DOCUMENTS

| | | |
|---|---|---|
| DE | 102 45 202 A1 | 4/2004 |
| JP | 9-35737 A | 2/1997 |
| WO | WO 2006101071 A1 * | 9/2006 |

OTHER PUBLICATIONS

International Search Report and Written Opinion dated Mar. 5, 2008, issued in a counterpart International Application.
Chinese Office Action dated Mar. 9, 2010, and English translation thereof, issued in counterpart Chinese Application No. 200780010585.3.
Chinese Office Action dated Oct. 21, 2010, and English translation thereof, issued in counterpart Chinese Application No. 200780010585.3.

* cited by examiner

*Primary Examiner* — Gregg Cantelmo
(74) *Attorney, Agent, or Firm* — Holtz, Holtz, Goodman & Chick, PC

(57) ABSTRACT

A fastening member includes a pair of fastening members to sandwich an electricity generating cell therebetween. At least one of the pair of fastening members has electrical conductivity and is connected to the electricity generating cell. Current is collected using the at least one of the pair of the fastening members.

21 Claims, 22 Drawing Sheets

FIG. 17
200D
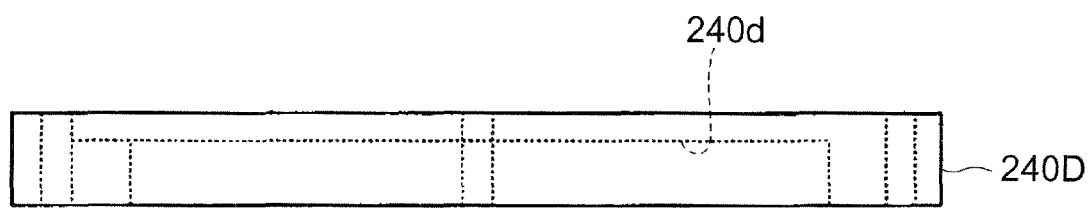
240d
240D
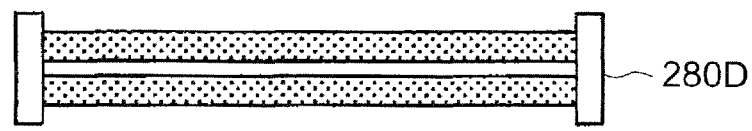
280D
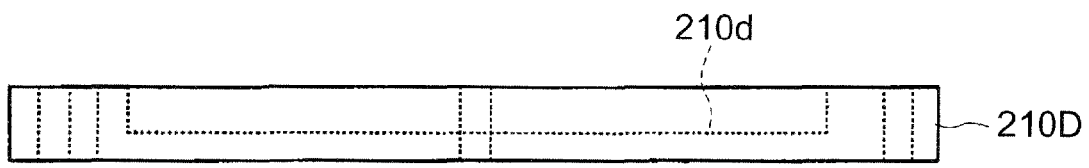
210d
210D

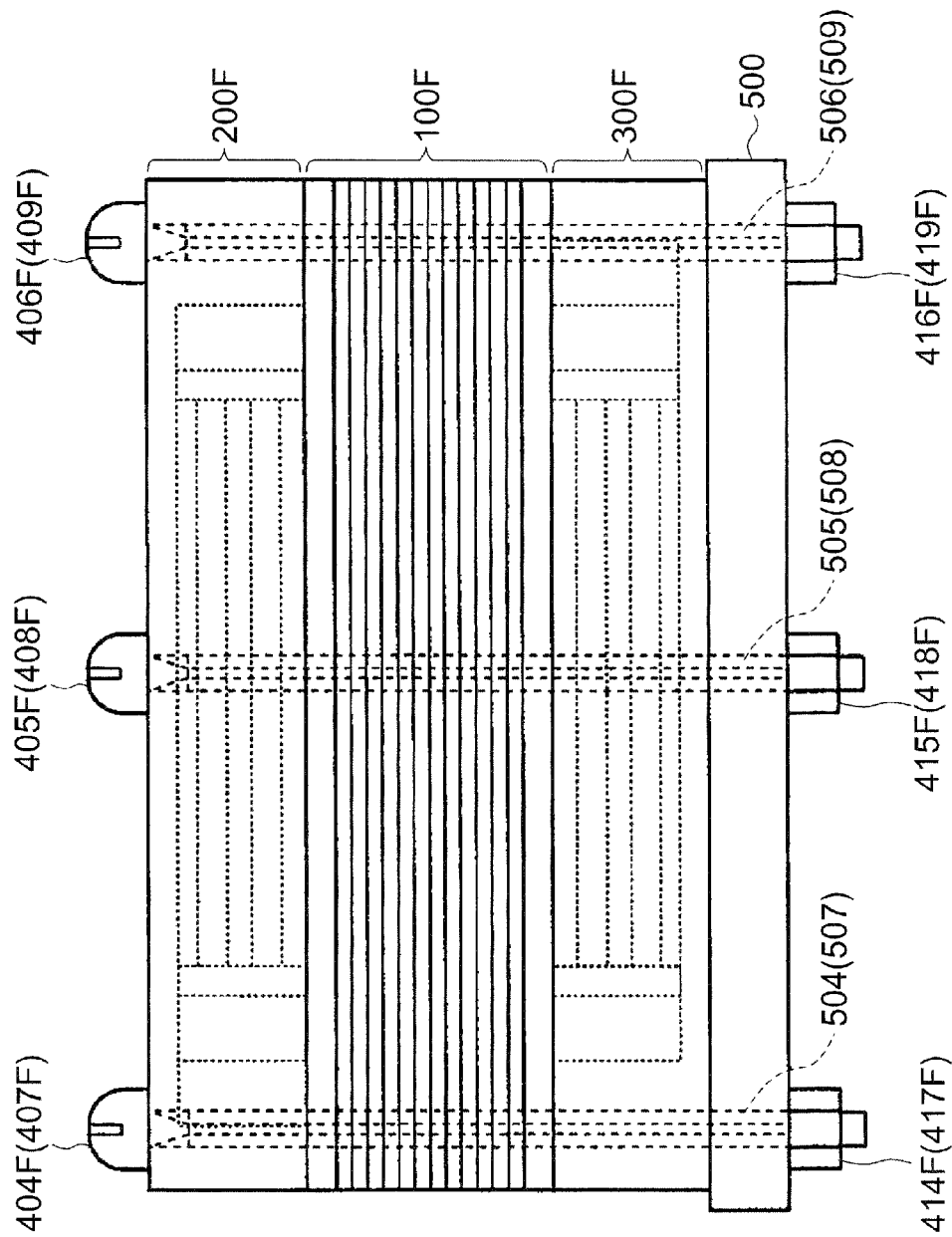

FASTENER, CELL STACK, FUEL CELL DEVICE, AND ELECTRONIC DEVICE

CROSS-REFERENCE TO RELATED APPLICATIONS

This application is based upon and claims the benefit of priority under 35 USC 119 of Japanese Patent Application No. 2006-304893 filed on Nov. 10, 2006, the entire disclosure of which, including the description, claims, drawings, and abstract, is incorporated herein by reference in its entirety.

BACKGROUND OF THE INVENTION

1. Field of the Invention

The present invention relates to a fastener for a cell stack, a cell stack, a fuel cell device using the cell stack, and an electronic device using the fuel cell device.

2. Description of the Related Art

A conventional fuel cell includes a fuel cell unit having two separators and a membrane electrode bonded body sandwiched between the separators. The membrane electrode bonded body has an electrolyte film, and the film is provided at a first surface thereof with a hydrogen electrode and at a second surface thereof with an oxygen electrode. The separators are respectively formed with an anode gas flow-path and a cathode gas flow-path. Anode gas is supplied to the hydrogen electrode of the membrane electrode bonded body through the anode gas flow-path, and cathode gas is supplied to the oxygen electrode through the cathode gas flow-path.

Hydrogen gas supplied to the hydrogen electrode becomes hydrogen ions and electrons, the electrons move to the hydrogen electrode, and the hydrogen ions pass through the electrolyte film and moves to the oxygen electrode. At the oxygen electrode, the hydrogen ions which have passed through the electrolyte film, the electrons which have moved from the hydrogen electrode to the oxygen electrode through an external circuit, and oxygen gas supplied to the oxygen electrode react with one another to produce water. A moving energy of the electrons can be utilized as electric energy.

As described in Japanese Patent Application Laid-open Publication No. 9-35737, a cell stack is known in which a plurality of electricity generating cells are stacked, current collecting plates are disposed at both ends of the cell stack, a humidifier is disposed outside of the current collecting plates, and the electricity generating cells, the current collecting plates and the humidifier are sandwiched between a pair of fastening plates, and the fastening plates are fastened to each other by means of a bolt.

SUMMARY OF THE INVENTION

The present invention provides a structure in which current collecting plates and fastening plates are integrally formed.

More specifically, according to one aspect of the present invention, a fastener includes a pair of fastening members to sandwich an electricity generating cell therebetween. At least one of the pair of fastening members has electrical conductivity and is connected to the electricity generating cell. Current is collected using the at least one of the pair of the fastening members.

According to another aspect of the present invention, a cell stack is be provided which includes an electricity generating cell, and a pair of fastening members to sandwich the electricity generating cell therebetween. At least one of the pair of fastening members has electrical conductivity and is connected to the electricity generating cell. Current is collected using the at least one of the pair of the fastening members.

According to a further aspect of the invention, a fuel cell includes the cell stack described above, a fuel container in which fuel to be used for the electricity generating cell is to be stored, and a fuel gas producing device to produce fuel gas from the fuel.

And according to a further aspect of the present invention, an electronic device is provided which includes the fuel cell device described above, and an electronic device main body to which the fuel cell device is attached.

BRIEF DESCRIPTION OF THE DRAWINGS

The present invention will sufficiently be understood by the following detailed description and accompanying drawing, but they are provided for illustration only, and not for limiting the scope of the invention.

FIG. 17 is an exploded view of an upper fastening member 200D according to a further modification;

FIG. 20 is a front view of a cell stack 1F;

DETAILED DESCRIPTION

Best Mode for Carrying Out the Invention

Embodiments of the present invention will be explained with reference to the drawings.

First Embodiment

Figure 1:
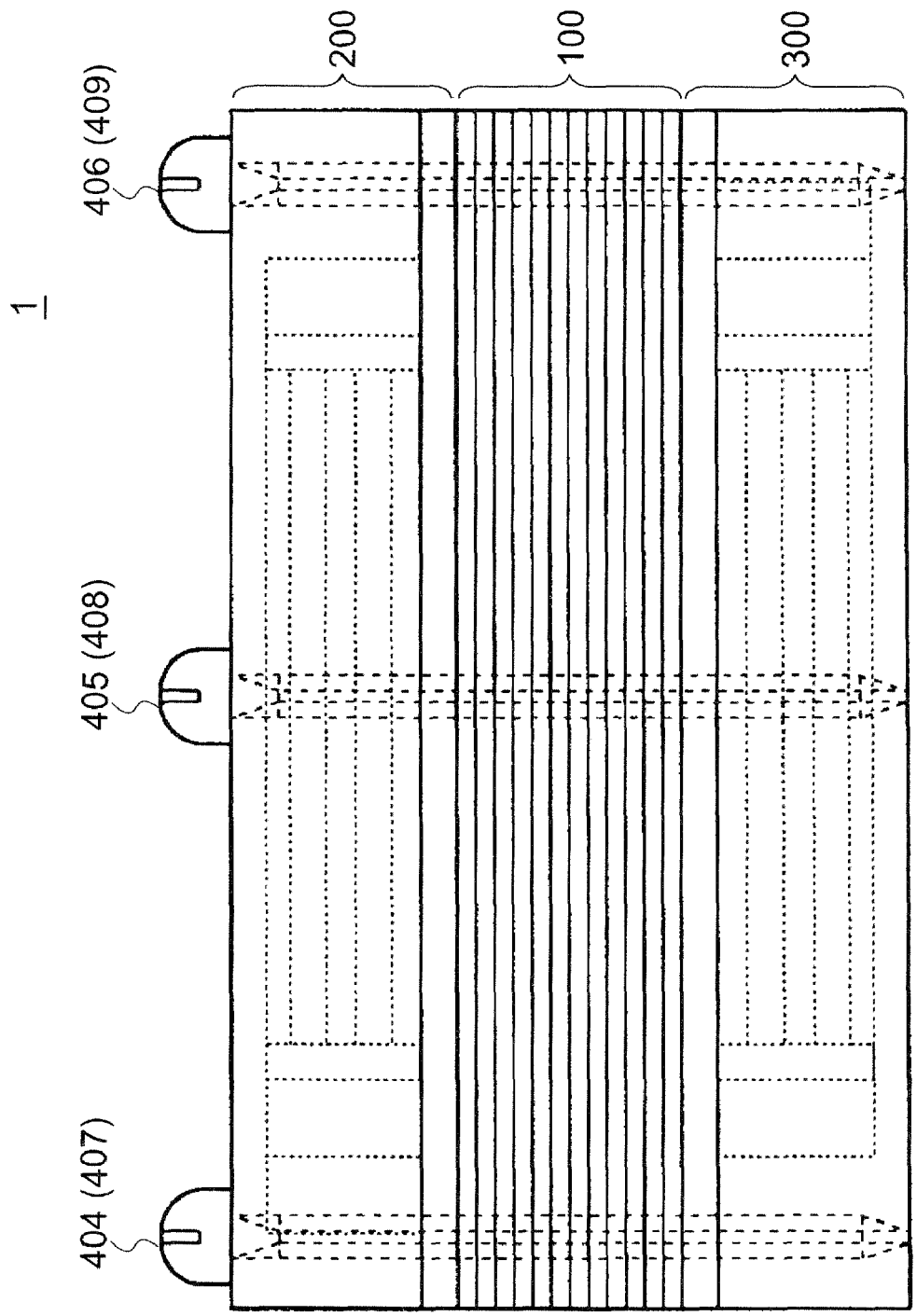
FIG. 1 is a front view of a cell stack 1 according to a first embodiment of the present invention.
Figure 2:
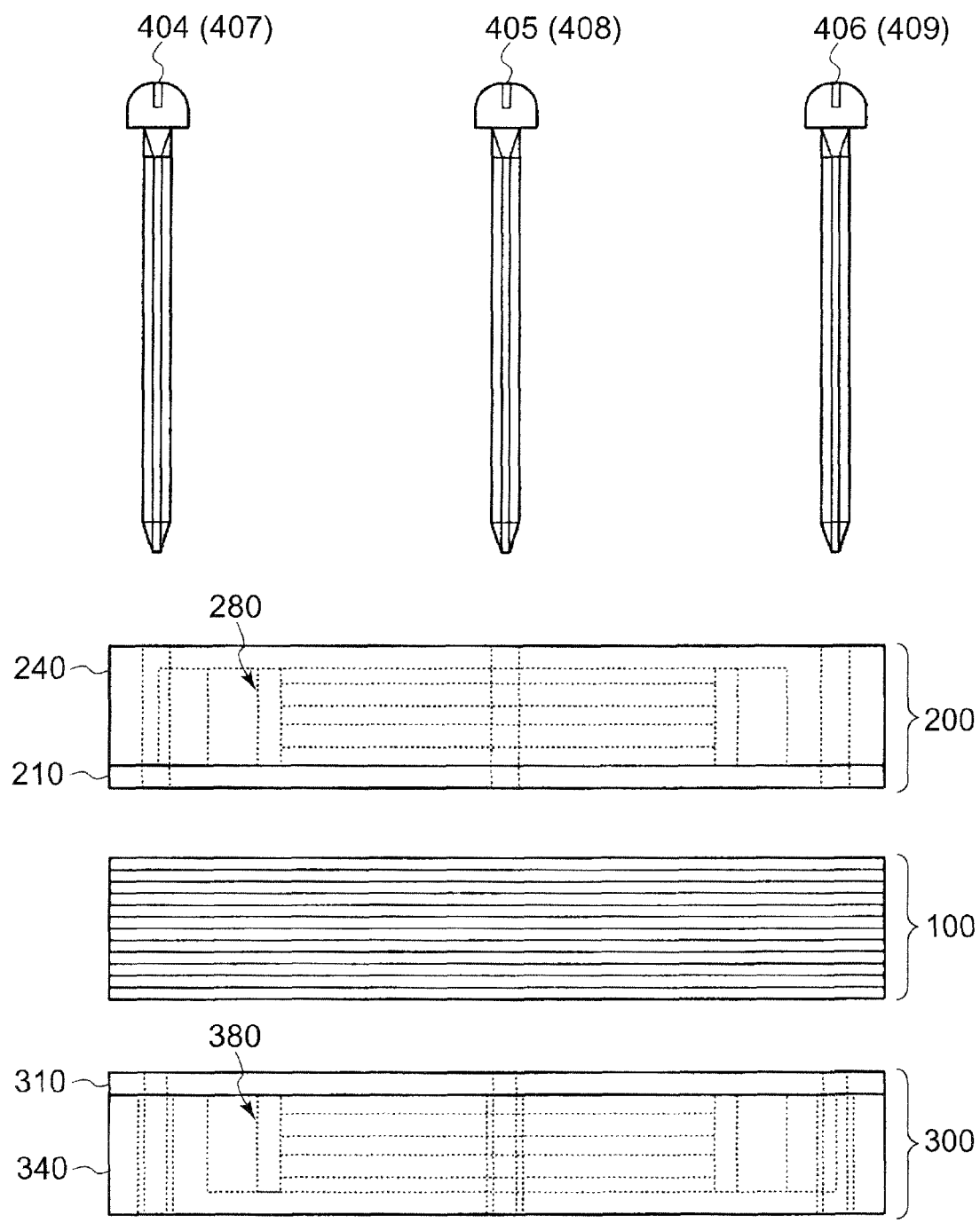
FIG. 2 is an exploded view of the cell stack 1.

FIG. 1 is a front view of a cell stack 1 according to a first embodiment of the present invention, and FIG. 2 is an exploded view of the cell stack 1. The cell stack 1 includes an electricity generating cell unit (electricity generating cell) 100, an upper fastening member 200 and a lower fastening member 300 respectively provided on upper and lower sides of the electricity generating cell unit 100, and bolts 404 to 409 for fastening the upper fastening member 200, the electricity generating cell unit 100 and the lower fastening member 300.

[Electricity Generating Cell Unit]

Figure 3:
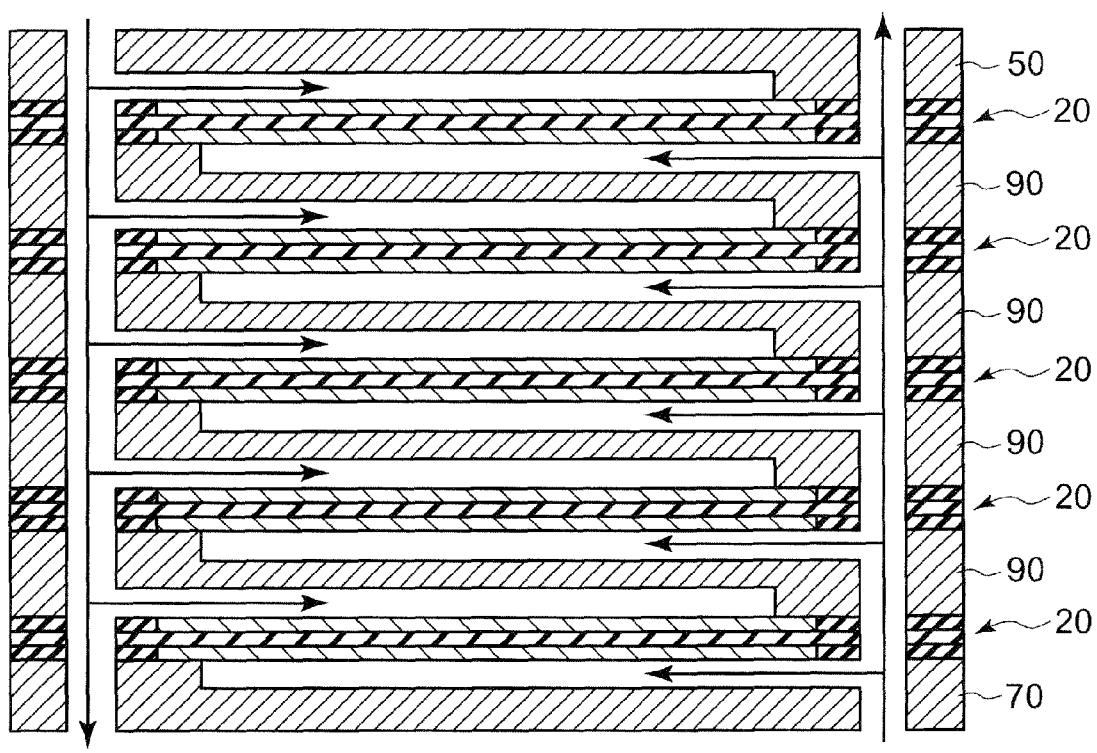
FIG. 3 is a sectional view of an electricity generating cell unit 100.

FIG. 3 is a sectional view of the electricity generating cell unit 100. As shown in FIG. 3, the electricity generating cell unit 100 includes unit electromotive sections 20, each including a membrane electrode bonded body, sandwiched between a single-sided separator 50 and a double-sided separator 90, or between double-sided separators 90, or between a double-sided separator 90 and a single-sided separator 70. A structure in which one of the unit electromotive sections 20 is sandwiched between the single-sided separator 50 and the double-sided separator 90, each structure in which one of the unit electromotive sections 20 is sandwiched between double-sided separators 90, and a structure in which one of the unit electromotive sections 20 is sandwiched between the double-sided separator 90 and the single-sided separator 70 is a unit electricity generating cell.

Figure 4:
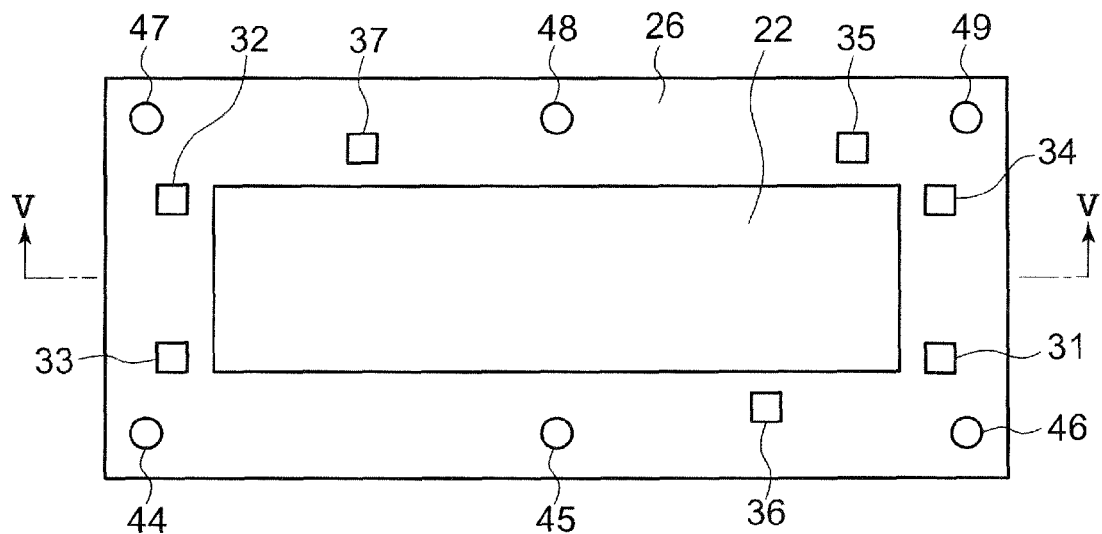
FIG. 4 is a top view of a unit electromotive section 20.
Figure 5:
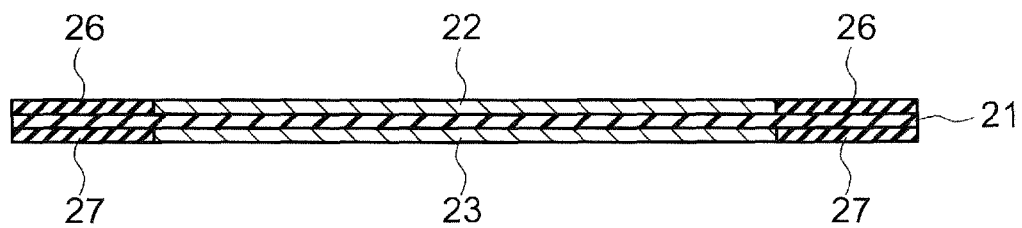
FIG. 5 is a sectional view taken along line V-V in FIG. 4.

FIG. 4 is a top view of the unit electromotive section 20, and FIG. 5 is a sectional view taken along the line V-V in FIG. 4. As shown in FIGS. 4 and 5, the unit electromotive section 20 includes a membrane electrode bonded body 21, gas dispersion layers 22 and 23, and gaskets 26 and 27.

The solid high polymer electrolyte film is formed into a rectangular or square shape, and hydrogen ions (H+) selectively pass through the film. Rectangular or square catalysts which also function as electrodes (not shown) are formed on central portions of both surfaces of the solid high polymer electrolyte film. The gas dispersion layers 22 and 23, which have gas permeability and electrical conductivity, are formed on the catalysts. The gas dispersion layer 22 is connected to the catalyst on the first surface, and the gas dispersion layer 22 together with the catalyst functions as an anode (hydrogen electrode). The gas dispersion layer 23 is connected to the catalyst on the second surface, and the gas dispersion layer 23 together with the catalyst functions as a cathode (oxygen electrode).

The gasket 26 is a rectangular or square frame gasket and is provided on an outer periphery of the first surface of the membrane electrode bonded body 21 so as to surround the gas dispersion layer 22. The gasket 27 is rectangular or square frame gasket and is provided on an outer periphery of the second surface of the membrane electrode bonded body 21 so as to surround the gas dispersion layer 23. The gaskets 26 and 27 are insulators and elastic bodies. The gaskets 26 and 27 function as spacers for disposing the gas dispersion layers 22 and 23 and the catalysts between the separators 50, 90 and 70 sandwiching the unit electromotive sections 20. The gaskets 26 and 27 also function as gas seals for preventing anode gas supplied from the single-sided separator 50 and the double-sided separators 90, and cathode gas supplied from the double-sided separator 90s and the single-sided separator 70 from leaking from the cell stack 1. The gaskets 26 and 27 can be made of isobutylene rubber, for example.

An anode gas introducing hole 31, an anode gas discharge hole 32, a cathode gas introducing hole 33, a cathode gas discharge hole 34, a pre-humidification cathode gas supply hole 35, a cathode gas humidifying fluid supply hole 36, a cathode gas humidifying fluid discharge hole 37 and bolt holes (through holes) 44 to 49 are formed to penetrate through the gaskets 26 and 27 and the membrane electrode bonded body 21 outside of a periphery of the gas dispersion layers 22 and 23. The cathode gas humidifying fluid supply hole 36 and the cathode gas humidifying fluid discharge hole 37 are formed in opposite sides to each other in a lateral (short) direction of the unit electromotive sections 20 with respect to the gas dispersion layers 22. The cathode gas humidifying fluid supply hole 36 and the cathode gas humidifying fluid discharge hole 37 may be any configuration through which the humidifying fluids can be smoothly passed into a recess 340a described below. Accordingly, it is not required they are formed in opposite sides to each other in the lateral direction of the unit electromotive sections 20, and they may be formed in the same side in the lateral direction or in the same side in the longitudinal direction of the unit electromotive sections 20.

The cathode gas introducing hole 33 and the pre-humidification cathode gas supply hole 35 are formed at opposite ends of the unit electromotive section 20 in the longitudinal direction thereof. These holes 33 and 35 may be any configuration through which the cathode gas or anode gas pass into a plurality of hollow fiber membranes 281, and it is not required they are disposed on the opposite sides of the unit electromotive section 20.

Figure 6:
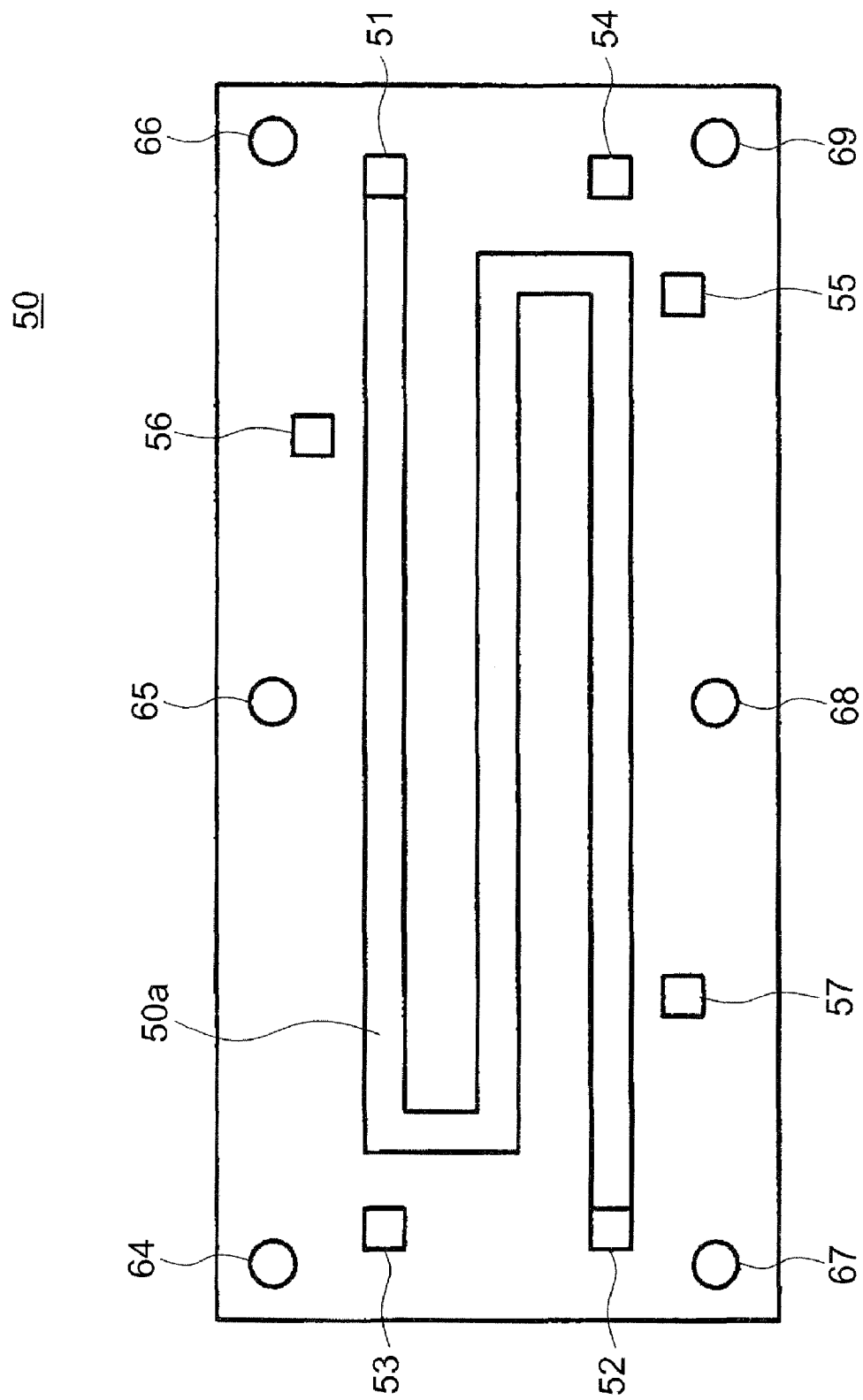
FIG. 6 is a bottom view of a single-sided separator 50.

FIG. 6 shows a lower surface (surface abutting against the gas dispersion layer 22) of the single-sided separator 50. An anode gas introducing hole 51, an anode gas discharge hole 52, a cathode gas introducing hole 53, a cathode gas discharge hole 54, a pre-humidification cathode gas supply hole 55, a cathode gas humidifying fluid supply hole 56, a cathode gas humidifying fluid discharge hole 57 and bolt holes (through holes) 64 to 69 are formed in the single-sided separator 50 so as to penetrate the single-sided separator 50 at locations respectively corresponding to the locations in the unit electromotive section 20 of the anode gas introducing hole 31, the anode gas discharge hole 32, the cathode gas introducing hole 33, the cathode gas discharge hole 34, the pre-humidification cathode gas supply hole 35, the cathode gas humidifying fluid supply hole 36, the cathode gas humidifying fluid discharge hole 37 and the bolt holes 44 to 49.

A serpentine meandering groove 50a is formed in a central portion of the lower surface of the single-sided separator 50. One end of the meandering groove 50a is introduced into the anode gas introducing hole 51, and the other end thereof is introduced into the anode gas discharge hole 52. The meandering groove 50a is covered with the gas dispersion layer 22 so that an anode gas flow-path which extends from the anode gas introducing hole 51 to the anode gas discharge hole 52 is formed.

Figure 7:
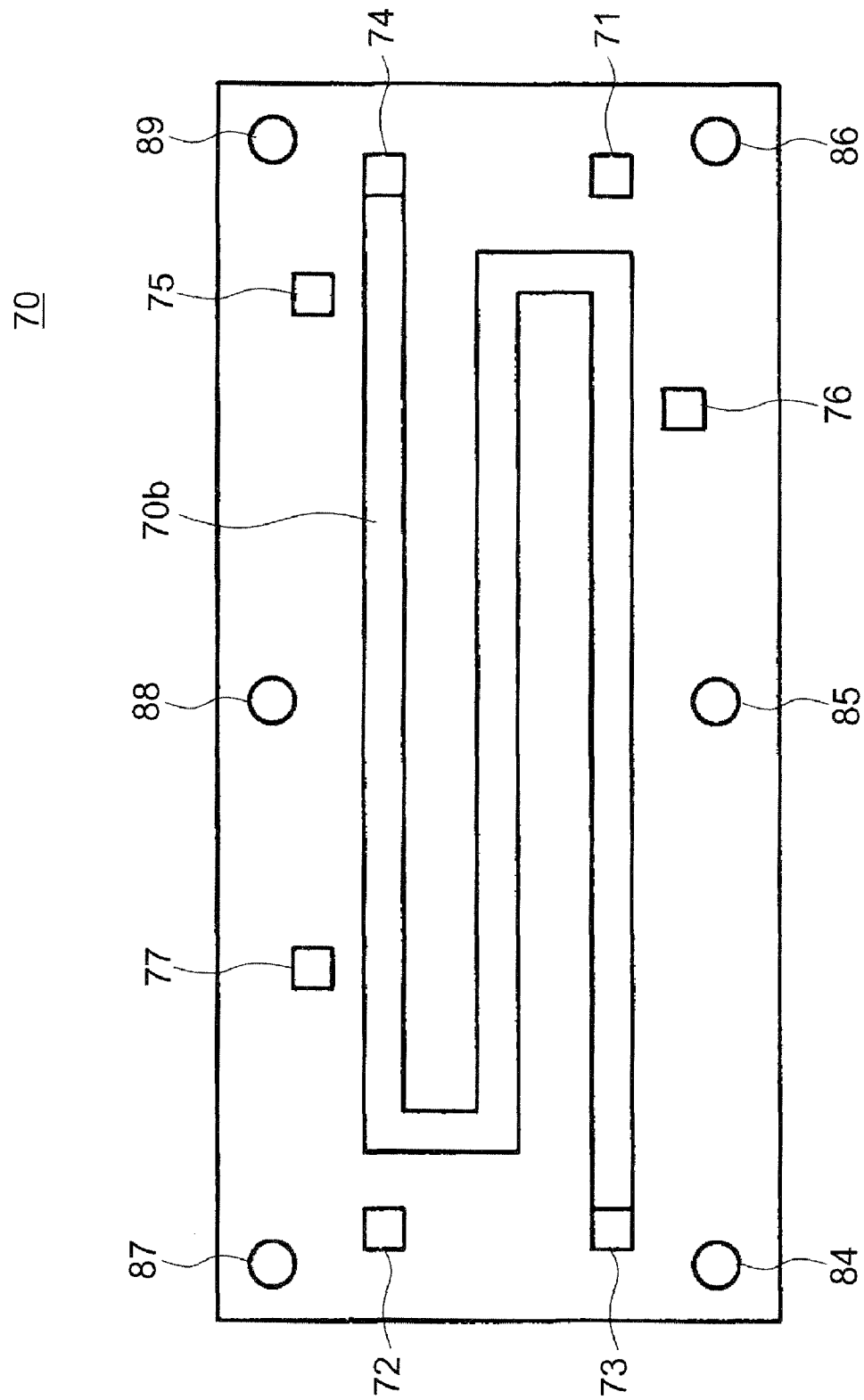
FIG. 7 is a top view of a single-sided separator 70.

FIG. 7 shows an upper surface (surface abutting against the gas dispersion layer 23) of the single-sided separator 70. An anode gas introducing hole 71, an anode gas discharge hole 72, a cathode gas introducing hole 73, a cathode gas discharge hole 74, a pre-humidification cathode gas supply hole 75, a cathode gas humidifying fluid supply hole 76, a cathode gas humidifying fluid discharge hole 77 and bolt holes (through holes) 84 to 89 are formed in the single-sided separator 70 so as to penetrate the single-sided separator 70 at locations respectively corresponding to the locations in the unit electromotive section 20 of the anode gas introducing hole 31, the anode gas discharge hole 32, the cathode gas introducing hole 33, the cathode gas discharge hole 34, the pre-humidification cathode gas supply hole 35, the cathode gas humidifying fluid supply hole 36, the cathode gas humidifying fluid discharge hole 37 and the bolt holes 44 to 49.

A serpentine meandering groove 70b is formed in a central portion of the upper surface of the single-sided separator 70. One end of the meandering groove 70b is introduced into cathode gas introducing hole 73 and the other end thereof is introduced into the cathode gas discharge hole 74. The meandering groove 70b is covered with the gas dispersion layer 23 so that a cathode gas flow-path which extends from the cathode gas introducing hole 73 to the cathode gas discharge hole 74 is formed.

Figure 8A:
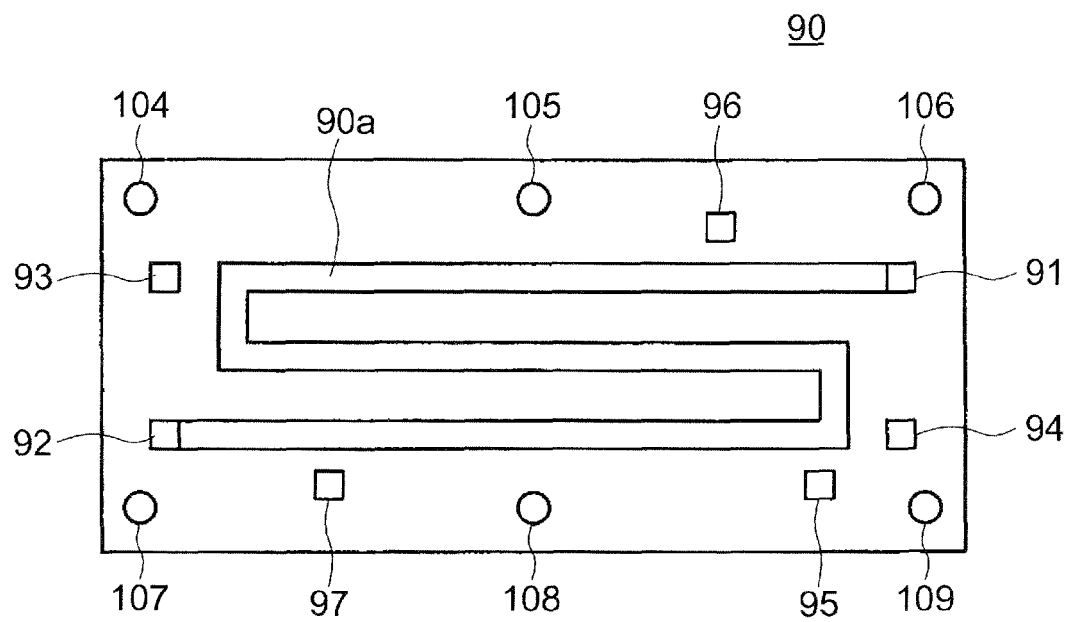
FIG. 8A is a bottom view of a double-sided separator 90.
Figure 8B:
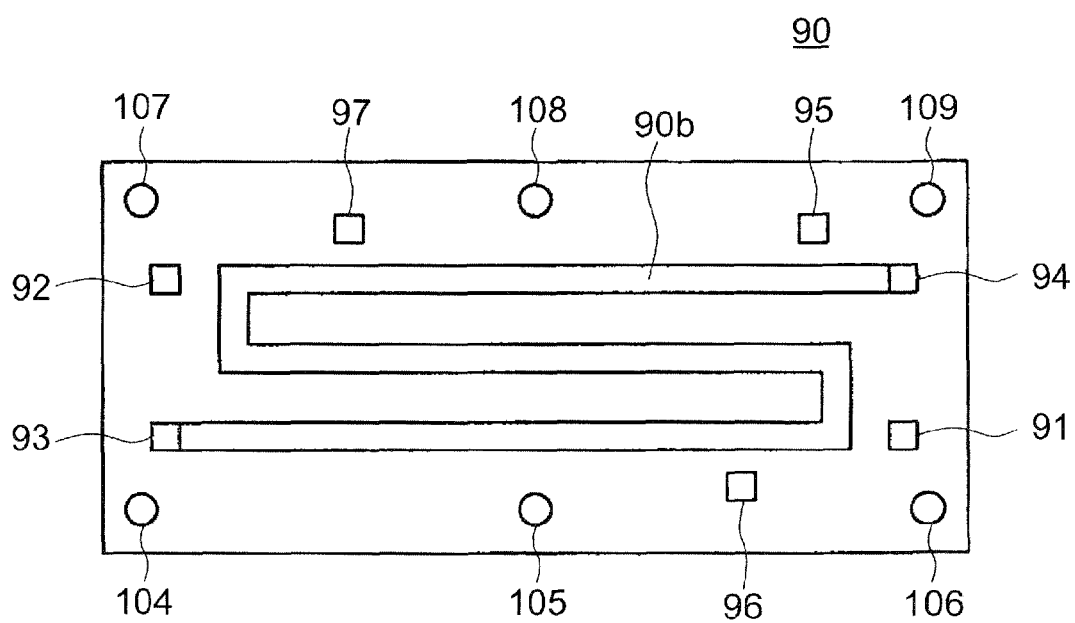
FIG. 8B is a top view of the double-sided separator 90.

FIG. 8A shows a lower surface (a surface abutting against the gas dispersion layer 22 of one of the unit electromotive sections 20) of each double-sided separator 90, and FIG. 8B shows an upper surface (a surface abutting against the gas dispersion layer 23 of one of the unit electromotive sections 20) of each double-sided separator 90. An anode gas introducing hole 91, an anode gas discharge hole 92, a cathode gas introducing hole 93, a cathode gas discharge hole 94, a pre-humidification cathode gas supply hole 95, a cathode gas humidifying fluid supply hole 96, a cathode gas humidifying fluid discharge hole 97 and bolt holes (through holes) 104 to 109 are formed in each double-sided separator 90 so as to penetrate the double-sided separator 90 at locations respectively corresponding to the locations in the unit electromotive section 20 of the anode gas introducing hole 31, the anode gas discharge hole 32, the cathode gas introducing hole 33, the cathode gas discharge hole 34, the pre-humidification cathode gas supply hole 35, the cathode gas humidifying fluid supply hole 36, the cathode gas humidifying fluid discharge hole 37 and the bolt holes 44 to 49.

A serpentine meandering groove 90a is formed in a central portion of the lower surface of each double-sided separator 90. One end of the meandering groove 90a is introduced into the anode gas introducing hole 91 and the other end thereof is introduced into the anode gas discharge hole 92. The meandering groove 90a is covered with the gas dispersion layer 22 so that an anode gas flow-path which extends from the anode gas introducing hole 91 to the anode gas discharge hole 92 is formed.

A serpentine meandering groove 90b is formed in a central portion of the upper surface of each double-sided separator 90. One end of the meandering groove 90b is introduced into the cathode gas introducing hole 93 and the other end thereof is introduced into the cathode gas discharge hole 94. The meandering groove 90b is covered with the gas dispersion layer 23 so that a cathode gas flow-path which extends from the cathode gas introducing hole 93 to the cathode gas discharge hole 94 is formed.

If the unit electromotive sections 20 are sandwiched between the single-sided separator 50 and the double-sided separator 90, between adjacent ones of the double-sided separators 90, 90, 90, and between the double-sided separator 90 and the single-sided separator 70, the anode gas introducing holes 31, 51, 71 and 91 form a continuous anode gas introducing flow-path, and the cathode gas introducing holes 33, 53, 73 and 93 form a continuous cathode gas introducing flow-path, as shown in FIG. 3.

Similarly, although not shown, the anode gas discharge holes 32, 52, 72 and 92 form a continuous anode gas discharging flow-path, the cathode gas discharge holes 34, 54, 74 and 94 form a continuous cathode gas discharging flow-path, the pre-humidification cathode gas supply holes 35, 55, 75 and 95 form a continuous pre-humidification cathode gas supplying flow-path, the cathode gas humidifying fluid supply holes 36, 56, 76 and 96 form a continuous cathode gas humidifying fluid supplying flow-path, and the cathode gas humidifying fluid discharge holes 37, 57, 77 and 97 form a continuous cathode gas humidifying fluid discharging flow-path.

Further, the bolt holes 44 to 49, 64 to 69, 74 to 79 and 104 to 109 form screw through holes.

[Upper Fastening Member]

The upper fastening member 200 includes a cover plate (lid body) 210, a container body 240 and a hollow fiber membrane module 280 accommodated in the container body 240 (see FIG. 2). The cover plate 210 and the container body 240 form a casing for a humidifier (humidity changing device) which humidifies the cathode gas.

An electricity leading-out wire (not shown) for leading out electricity is connected to the upper fastening member 200 by brazing. The upper fastening member 200 thereby functions as an outputting external electrode, and thus, the upper fastening member 200 also functions as a current collecting plate.

The cover plate 210 and the container body 240 are made of an electrically conductive material having high rigidity, such as metal, and can function as current collecting plates for leading out electric energy generated by the electricity generating cell unit 100. It is preferable that the thermal conductivity of the cover plate 210 and the container body 240 is high.

Surfaces of the cover plate 210 and the container body 240 are coated with Ni base plating and Au plating so that electric resistance is reduced, corrosion can be suppressed and metal ions are prevented from eluting.

Figure 9A:
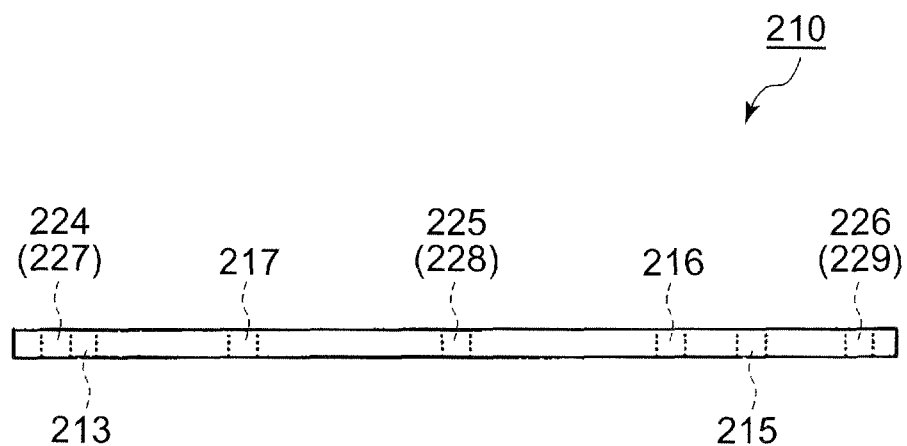
FIG. 9A is a side view of a cover plate 210 of an upper fastening member 200.
Figure 9B:
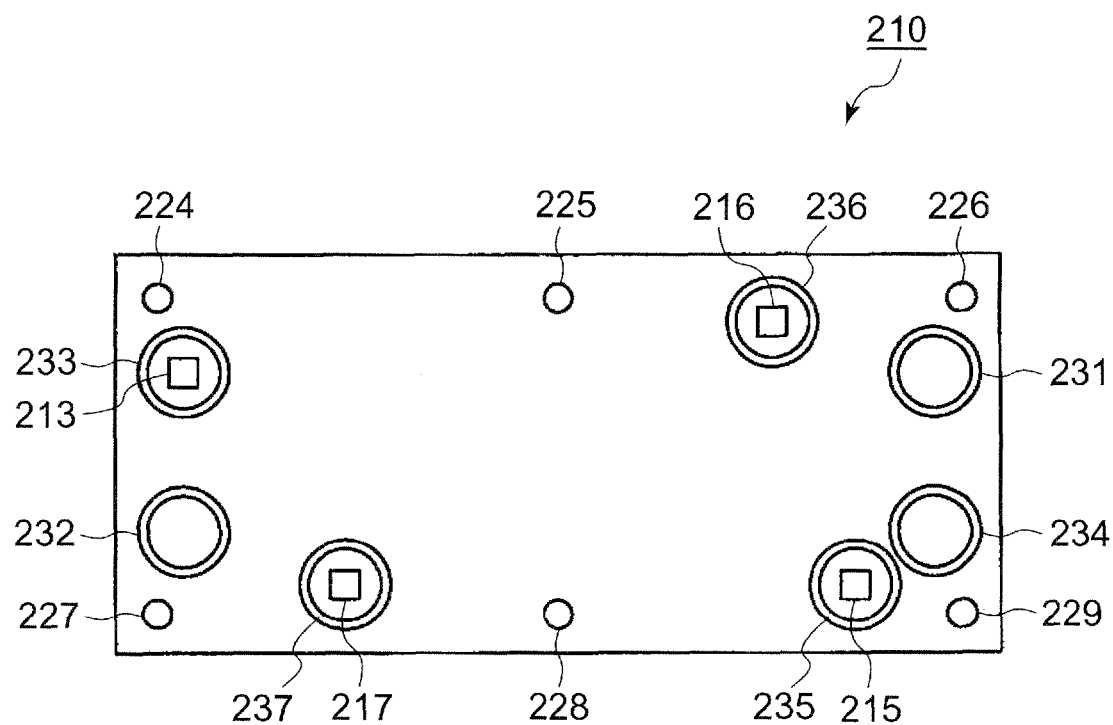
FIG. 9B is a bottom view of the cover plate 210.

FIG. 9A is a side view of the cover plate 210 of the upper fastening member 200, and FIG. 9B is a bottom view of the cover plate 210. As shown in FIGS. 9A and 9B, a cathode gas introducing hole 213, a pre-humidification cathode gas supply hole 215, a cathode gas humidifying fluid supply hole 216, a cathode gas humidifying fluid discharge hole 217 and bolt holes (through holes) 224 to 229 are formed in the cover plate 210 at locations respectively corresponding to the locations in the single-sided separator 50 of the cathode gas introducing hole 53, the pre-humidification cathode gas supply hole 55, the cathode gas humidifying fluid supply hole 56, the cathode gas humidifying fluid discharge hole 57 and the bolt holes 64 to 69.

O-rings 231, 232, 233, 234, 235, 236 and 237 are provided on an outer periphery of a lower surface of the cover plate 210 at locations respectively corresponding to the locations in the single-sided separator 50 of the anode gas introducing hole 51, the anode gas discharge hole 52, the cathode gas introducing hole 53, the cathode gas discharge hole 54, the pre-humidification cathode gas supply hole 55, the cathode gas humidifying fluid supply hole 56 and the cathode gas humidifying fluid discharge hole 57. The O-rings 231 to 237 seal gaps between the upper surface of the single-sided separator 50 and the lower surface of the cover plate 210.

Figure 10A:
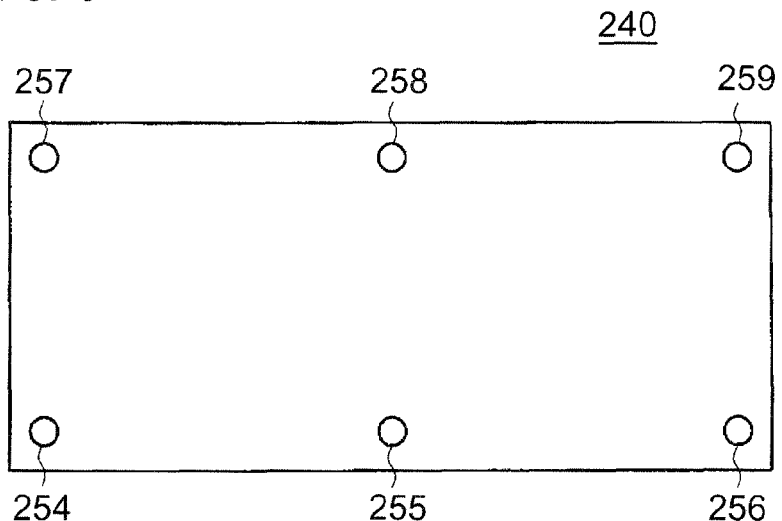
FIG. 10A is a top view showing a container body 240 of the upper fastening member 200.
Figure 10B:
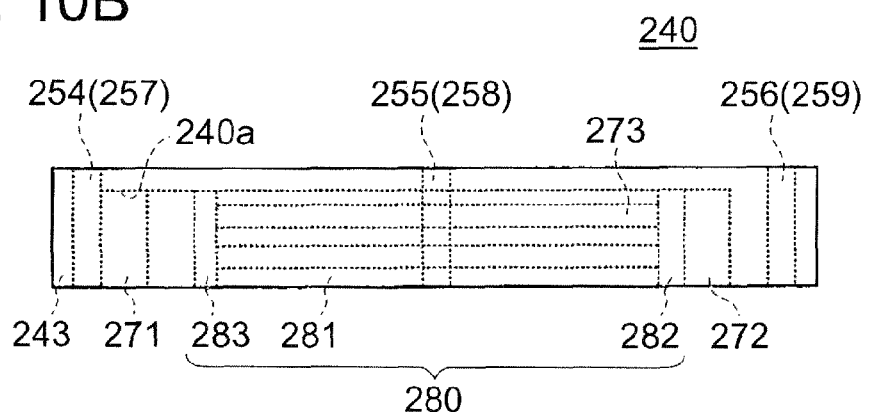
FIG. 10B is a side view showing the container body 240 of the upper fastening member 200.
Figure 10C:
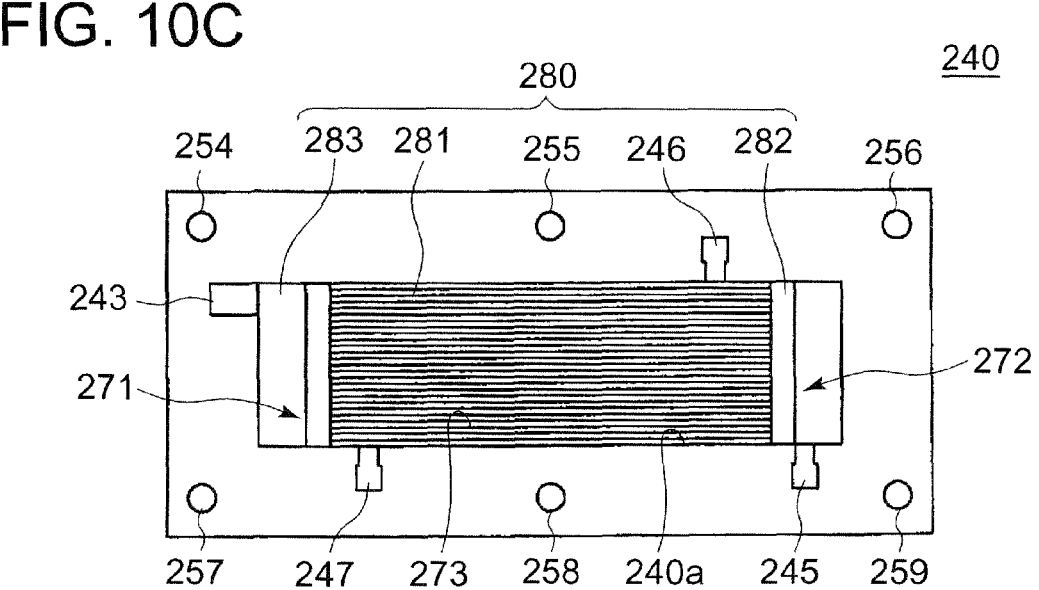
FIG. 10C is a bottom view showing the container body 240 of the upper fastening member 200.

FIG. 10A is a top view showing the container body 240 of the upper fastening member 200, FIG. 10B is a side view showing the container body 240 of the upper fastening member 200, and FIG. 10C is a bottom view showing the container body 240 of the upper fastening member 200. A recess 240a is formed in a central portion of a lower surface of the container body 240, and the hollow fiber membrane module 280 is accommodated in the recess 240a. A cathode gas introducing groove 243, a pre-humidification cathode gas supplying groove 245, a cathode gas humidifying fluid supplying groove 246 and a cathode gas humidifying fluid discharging groove 247 are formed in the lower surface of the container body 240. The cathode gas introducing groove 243, the pre-humidification cathode gas supplying groove 245, the cathode gas humidifying fluid supplying groove 246 and the cathode gas humidifying fluid discharging groove 247 are connected to the recess 240a from locations respectively corresponding to the cathode gas introducing hole 213, the pre-humidification cathode gas supply hole 215, the cathode gas humidifying fluid supply hole 216 and the cathode gas humidifying fluid discharge hole 217. Bolt holes (through holes) 254 to 259 are formed in the container body 240 so as to vertically penetrate the container body 240 at locations corresponding to the bolt holes 224 to 229.

As described in more detail below, the hollow fiber membrane module 280 which is accommodated in the recess 240a functions as a humidifier which humidifies the cathode gas.

The hollow fiber membrane module 280 includes a plurality of hollow fiber membranes 281 and sealing/fixing portions 282 and 283 provided on respective ends of the hollow fiber membrane module 280 (at respective ends of the hollow fiber membranes 281). Each hollow fiber membrane 281 is provided at its center portion with a cavity 281a, and the hollow fiber membranes 281 are permeable to water molecules. As the hollow fiber membrane 281, it is possible to use polyimide or fluorine-based high polymer film such as polyphenyl sulfone and polyether imide which are fine porous material produced by NOK Corporation, or tetrafluoroethylene+perfluoro vinyl ether which is non-porous material produced by Asahi Glass Co., LTD. Further, a hollow fiber membrane made of polyethylene, PVDF (polyvinylidene fluolite), polyether fulfone, polyacrylonitrile or cellulose acetate may be used.

Figure 11A:
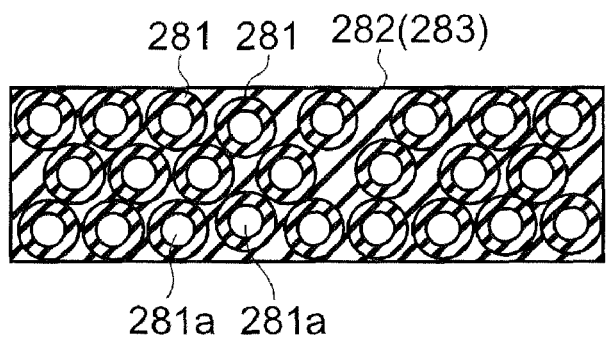
FIGS. 11A and 11B are a side view of a hollow fiber membrane module 280 of the upper fastening member 200, and a side view of a hollow fiber membrane module 380 of a lower fastening member 300.
Figure 11B:
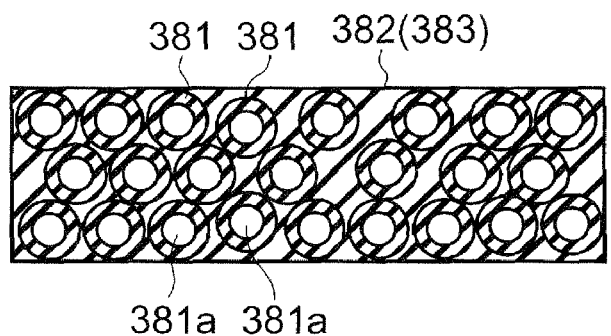

FIG. 11A is a side view of the hollow fiber membrane module 280 of the upper fastening member 200. The sealing/fixing portions 282 and 283 are formed by hardening a thermosetting resin, an air-setting resin, a photo-curing resin or the like, and both ends of a plurality of the hollow fiber membranes are fixed by the sealing/fixing portions 282 and 283. As shown in FIG. 11A, the hollow fiber membranes 281 penetrate the sealing/fixing portions 282 and 283.

As shown in FIG. 10C, the hollow fiber membrane module 280 is accommodated in the recess 240a, and a space in the recess 240a is divided into three sections by the sealing/fixing portions 282 and 283. Left and right sections with respect to the hollow fiber membrane module 280 are the cathode gas introducing portion 271 connected to the cathode gas introducing groove 243, and the pre-humidification cathode gas supplying portion 272 connected to the pre-humidification cathode gas supplying groove 245, respectively. The cathode gas introducing portion 271 and the pre-humidification cathode gas supplying portion 272 are connected to each other through the cavities 281a of the hollow fiber membranes 281.

A space between the sealing/fixing portions 282 and 283 becomes a cathode gas humidifying fluid flow-path 273 which is in connected to the cathode gas humidifying fluid supplying groove 246 and the cathode gas humidifying fluid discharging groove 247.

If cathode gas flows through the cavities 281a of the hollow fiber membrane 281 and cathode gas humidifying fluid passes through the cathode gas humidifying fluid flow-path 273, water molecules in the cathode gas humidifying fluid pass through the hollow fiber membranes 281 and move to the cavities 281a. The water molecule vaporize in the cathode gas, and thereby the cathode gas can be humidified.

[Lower Fastening Member]

The lower fastening member 300 includes a cover plate 310, a container body 340 and a hollow fiber membrane module 380 accommodated in the container body 340 (see FIG. 2). The cover plate 310 and the container body 340 form a casing of a humidifier which humidifies anode gas.

An electricity leading-out wire (not shown) for leading out electricity is connected to the lower fastening member 300 by brazing. The lower fastening member 300 thereby functions as an outputting external electrode, and thus, the lower fastening member 300 also functions as a current collecting plate.

The cover plate 310 and the container body 340 are made of an electrically conductive material having high rigidity, such as metal, and can function as current collecting plates for leading out electric energy generated by the electricity generating cell unit 100. It is preferable that the thermal conductivity of the cover plate 310 and the container body 340 is high.

Surfaces of the cover plate 310 and the container body 340 are coated with Ni base plating and Au plating so that electric resistance is reduced, corrosion can be suppressed and metal ions are prevented from eluting.

Figure 12A:
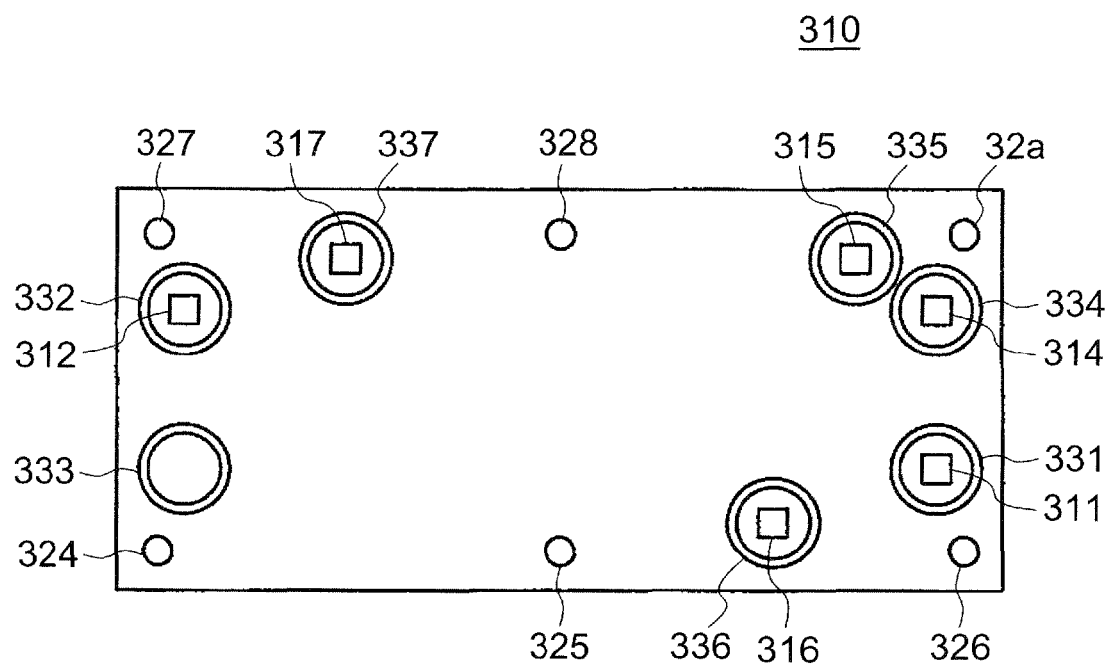
FIG. 12A is a top view of a cover plate 310 of the lower fastening member 300.
Figure 12B:
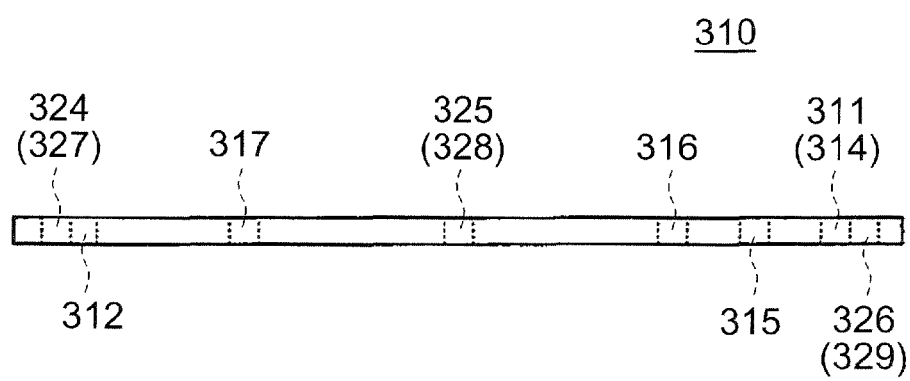
FIG. 12B is a side view of the cover plate 310.

FIG. 12A is a plan view of the cover plate 310 of the lower fastening member 300, and FIG. 12B is a side view of the cover plate 310. As shown in FIGS. 12A and 12B, an anode gas introducing hole 311, an anode gas discharge hole 312, a cathode gas discharge hole 314, a pre-humidification cathode gas supply hole 315, a cathode gas humidifying fluid supply hole 316, a cathode gas humidifying fluid discharge hole 317, and bolt holes (threading holes) 324 to 329 are formed in the cover plate 210 at locations respectively corresponding to the locations in the single-sided separator 70 of the anode gas introducing hole 71, the anode gas discharge hole 72, the cathode gas discharge hole 74, the pre-humidification cathode gas supply hole 75, the cathode gas humidifying fluid supply hole 76, the cathode gas humidifying fluid discharge hole 77 and bolt hole 84 to 89.

O-rings 331, 332, 333, 334, 335, 336 and 337 are provided on an outer periphery of an upper surface of the cover plate 310 at locations respectively corresponding to the locations in the single-sided separator 70 of the anode gas introducing hole 71, the anode gas discharge hole 72, the cathode gas introducing hole 73, the cathode gas discharge hole 74, the pre-humidification cathode gas supply hole 75, the cathode gas humidifying fluid supply hole 76 and the cathode gas humidifying fluid discharge hole 77 respectively. The O-rings 331 to 337 seal gaps between the lower surface of the single-sided separator 70 and the upper surface of the cover plate 310.

Figure 13A:
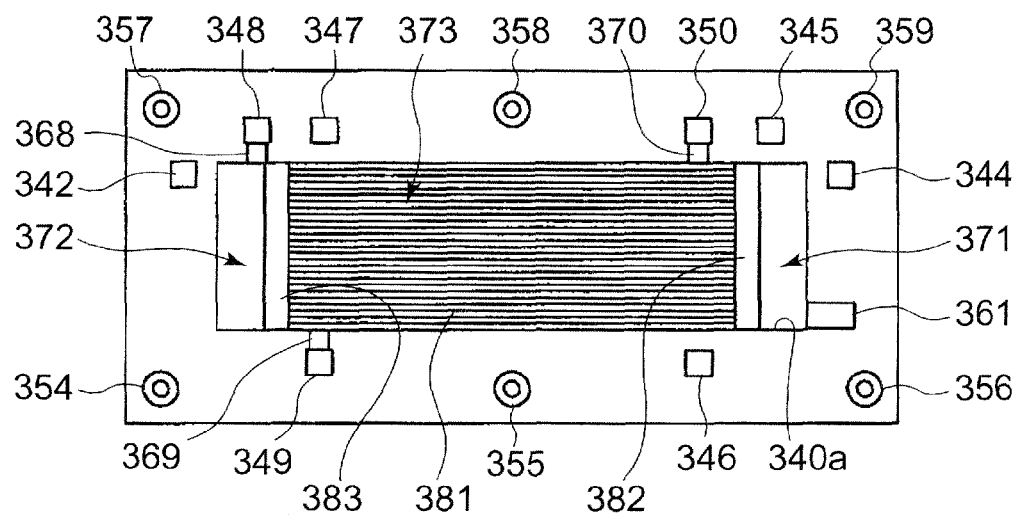
FIG. 13A is a top view showing a container body 340 of the lower fastening member 300.
Figure 13B:
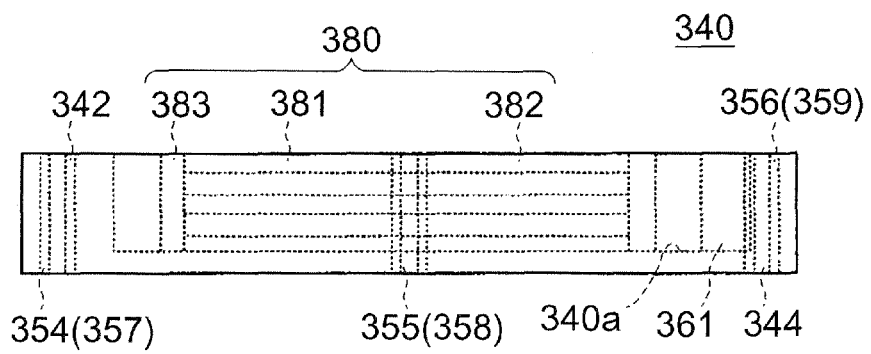
FIG. 13B is a side view showing the container body 340 of the lower fastening member 300.
Figure 13C:
FIG. 13C is a bottom view showing the container body 340 of the lower fastening member 300.

FIG. 13A is a top view showing the container body 340 of the lower fastening member 300, FIG. 13B is a side view showing the container body 340 of the lower fastening member 300, and FIG. 13C is a bottom view showing the container body 340 of the lower fastening member 300. An anode gas discharge hole 342, a cathode gas discharge hole 344, a pre-humidification cathode gas supply hole 345, a cathode gas humidifying fluid supply hole 346 and a cathode gas humidifying fluid discharge hole 347 are formed in the container body 340 so as to penetrate the container body 340 in the vertical direction at locations respectively corresponding to the locations in the cover plate 310 of the anode gas discharge hole 312, the cathode gas discharge hole 314, the pre-humidification cathode gas supply hole 315, the cathode gas humidifying fluid supply hole 316 and the cathode gas humidifying fluid discharge hole 317. Bolt holes (threading holes) 354 to 359 are formed at locations respectively corresponding to the bolt holes 324 to 329 in the cover plate 310. The bolt holes 324 to 329 are formed with internal threads into which the bolts 404 to 409 are threadedly engaged.

A recess 340a in which the hollow fiber membrane module 380 is accommodated is formed in a central portion of an upper surface of the container body 340. As described in more detail below, the hollow fiber membrane module 380 which is accommodated in the recess 340a functions as a humidifier which humidifies the cathode gas.

An anode gas introducing groove 361 which is connected to the recess 340a from a location corresponding to the anode gas introducing hole 311 is provided in the upper surface of the container body 340. A pre-humidification anode gas supply hole 348 vertically penetrates the container body 340 at an end of the container body on an opposite side thereof, in a longitudinal direction, from the anode gas introducing groove 361. The pre-humidification anode gas supply hole 348 and the anode gas introducing groove 361 may be disposed outside the sealing/fixing portions 282 and 283 at the both ends of the hollow fiber membrane module 280 in the longitudinal direction of the container body 340. By this configuration, a pre-humidification anode gas supplying groove 368 described below can be formed short. A pre-humidification anode gas supplying groove 368 is provided in the upper surface of the container body 340. The pre-humidification anode gas supplying groove 368 connects the pre-humidification anode gas supply hole 348 and the recess 340a with each other.

An anode gas humidifying fluid supply hole 349 and an anode gas humidifying fluid discharge hole 350 are formed in opposite sides in a lateral (short side) direction of the container body 340 with respect to the recess 340a. The anode gas humidifying fluid supply hole 349 and the anode gas humidifying fluid discharge hole 350 are closer to the central portion in the longitudinal direction of the container body 340 than the anode gas introducing groove 361 and the pre-humidification anode gas supply hole 348. An anode gas humidifying fluid supplying groove 369 and an anode gas humidifying fluid discharging groove 370 are formed in the upper surface of the container body 340. The anode gas humidifying fluid supplying groove 369 connects the anode gas humidifying fluid supply hole 349 and the recess 340a, and the anode gas humidifying fluid discharging groove 370 connects the anode gas humidifying fluid discharge hole 350 and the recess 340a.

At the lower surface of the container body 340, an anode gas discharging pipe, a cathode gas discharging pipe, a pre-humidification cathode gas supplying pipe, a cathode gas humidifying fluid supplying pipe, a cathode gas humidifying fluid discharging pipe, a pre-humidification anode gas supplying pipe, an anode gas humidifying fluid supplying pipe and an anode gas humidifying fluid discharging pipe (not shown) are respectively connected to the anode gas discharge hole 342, the cathode gas discharge hole 344, the pre-humidification cathode gas supply hole 345, the cathode gas humidifying fluid supply hole 346, the cathode gas humidifying fluid discharge hole 347, the pre-humidification anode gas supply hole 348, the anode gas humidifying fluid supply hole 349 and the anode gas humidifying fluid discharge hole 350.

The hollow fiber membrane module 380 includes a plurality of hollow fiber membranes 381 each provided at its center with a cavity 381a, and sealing/fixing portions 382 and 383 provided on respective ends of the hollow fiber membrane module 380. The hollow fiber membrane module 380 has the same structure as the hollow fiber membrane module 280; therefore, explanation thereof will be omitted.

As shown in FIGS. 13A, 13B and 13C, the hollow fiber membrane module 380 is accommodated in the recess 340a such that the hollow fiber membranes 381 are disposed in the lateral direction, and the sealing/fixing portions 382 and 383 of the hollow fiber membrane module 380 divide a space in the recess 340a into three sections. Right and left (in FIG. 13A) sections with respect to the hollow fiber membrane module 380 are an anode gas introducing portion 371 connected to the anode gas introducing groove 361 and a pre-humidification anode gas supplying portion 372 connected to the pre-humidification anode gas supplying groove 368. The anode gas introducing portion 371 and the pre-humidification anode gas supplying portion 372 are connected to each other through the cavities 381a of the hollow fiber membranes 381.

A space between the sealing/fixing portions 382 and 383 becomes an anode gas humidifying fluid flow-path 373 which is connected to the anode gas humidifying fluid supplying groove 369 and the anode gas humidifying fluid discharging groove 370.

When anode gas flows through the cavities 381a of the hollow fiber membranes 381, and anode gas humidifying fluid flows through the anode gas humidifying fluid flow-path 373, water molecules in the anode gas humidifying fluid pass through the hollow fiber membranes 381 and move to the cavities 381a. The water molecules are evaporated in the anode gas and the anode gas can thereby be humidified.

[Bolts]

The bolts 404 to 409 are formed at their tip ends with external threads, and the tip ends engage with the bolt holes 354 to 359, respectively. Surfaces of portions of the bolts 404 to 409 other than the surfaces formed with the external threads are subjected to insulating processing by resin coating. In addition, washers made of insulative resin are interposed between the upper fastening member 200 and bolt heads, provided at the ends of the bolts opposite from the tip ends. With this structure, it is possible to provide reliable electrical isolation between the bolts 404 to 409 and the upper fastening member 200.

The upper fastening member 200, the electricity generating cell unit 100 and the lower fastening member 300 are laminated in this order. In this state, the bolts 404 to 409 are inserted through the bolt holes 44 to 49, 64 to 69, 84 to 89, 104 to 109, 224 to 229, 254 to 259 and 324 to 329, and are threadedly engaged into the bolt holes 354 to 359, and the cell stack 1 is assembled into the state shown in FIG. 1. The lower fastening member 300 fixed by the bolts 404 to 409 has a thickness along the longitudinal direction of the bolts 404 to 409 such that the electricity generating cell unit 100 can be fastened in a hermetic state thereof without threadedly engaging the bolts 404 to 409 with corresponding nuts. Thus, nuts are unnecessary in this embodiment.

According to the cell stack 1 which is assembled in the above-described manner, since each of the upper fastening member 200 and the lower fastening member 300 functions as a current collecting plate and a fastening plate, the number of parts can be reduced.

[Operation of Cell Stack]

Next, operation of the cell stack 1 will be explained. First, anode gas humidifying fluid, cathode gas humidifying fluid, anode gas and cathode gas are supplied to the cell stack 1, which has having a predetermined operation temperature 1. Supply of Anode Gas Humidifying Fluid Anode gas humidifying fluid is supplied from the anode gas humidifying fluid supply hole 349 such that the anode gas humidifying fluid flows through the anode gas humidifying fluid supplying groove 369, the anode gas humidifying fluid flow-path 373 and the anode gas humidifying fluid discharging groove 370, and is discharged from the anode gas humidifying fluid discharge hole 350.

2. Supply of Cathode Gas Humidifying Fluid

Cathode gas humidifying fluid is supplied from the cathode gas humidifying fluid supply holes 346 and 316 such that the cathode gas humidifying fluid flows through the cathode gas humidifying fluid supplying flow-path, the cathode gas humidifying fluid supply hole 216, the cathode gas humidifying fluid supplying groove 246, the cathode gas humidifying fluid flow-path 273, the cathode gas humidifying fluid discharging groove 247, the cathode gas humidifying fluid discharge hole 217, the cathode gas humidifying fluid discharging flow-path and the cathode gas humidifying fluid discharge hole 317, and is discharged from the cathode gas humidifying fluid discharge hole 347.

A fluid (one of gas and liquid) including water and having a humidity higher than a humidity of the anode gas and the cathode gas can be used as the anode gas humidifying fluid and cathode gas humidifying fluid. For example, water can be used as the fluid. Air bubbles may be mixed in the anode gas humidifying fluid and the cathode gas humidifying fluid. However, if an extremely large amount of air bubbles is mixed in the anode gas humidifying fluid and the cathode gas humidifying fluid, a gas-liquid separating film, through which anode gas humidifying fluid and cathode gas humidifying fluid hardly pass, may be provided at an outlet of the anode gas humidifying fluid flow-path 373 or the cathode gas humidifying fluid flow-path 273. Thus, the humidifying performance can be enhanced by raising pressure of the fluid in each flow-path.

3. Supply of Anode Gas

Anode gas flows from the pre-humidification anode gas supply hole 348 such that it flows through the pre-humidification anode gas supplying groove 368, the pre-humidification anode gas supplying portion 372, the cavities 381a of the hollow fiber membranes 381, the anode gas introducing portion 371, the anode gas introducing groove 361, the anode gas introducing hole 311, the anode gas introducing flow-path, the meandering grooves 90a and 50a, the anode gas discharging flow-path and the anode gas discharge hole 312, and is discharged from the anode gas discharge hole 342.

4. Supply of Cathode Gas

Cathode gas flows from the pre-humidification cathode gas supply hole 345 such that it flows through the pre-humidification cathode gas supplying hole 315, the pre-humidification cathode gas supplying flow-path, the pre-humidification cathode gas supply hole 215, the pre-humidification cathode gas supplying groove 245, the pre-humidification cathode gas supplying portion 272, the cavities 281a of the hollow fiber membranes 281, the cathode gas introducing portion 271, the cathode gas introducing groove 243, the cathode gas introducing hole 213, the cathode gas introducing flow-path, the meandering grooves 90b and 70b, the cathode gas discharging flow-path and the cathode gas discharge hole 314, and is discharged from the cathode gas discharge hole 344.

If anode gas humidifying fluid, cathode gas humidifying fluid, anode gas and cathode gas are supplied to the cell stack 1, since water molecules in the anode gas humidifying fluid flow-path 373 pass through the hollow fiber membranes 381 and are evaporated in the cavities 381a, anode gas which passes through the cavities 381a can be humidified. Similarly, since water molecules in the cathode gas humidifying fluid flow-path 273 pass through the hollow fiber membranes 281 and are evaporated in the cavities 281a, cathode gas which passes through the cavities 281a can be humidified.

The upper fastening member 200 and the lower fastening member 300 are adjacent to the electricity generating cell unit 100 and are made of material having high thermal conductivity.

Therefore, in the hollow fiber membrane module 280 provided in the upper fastening member 200, heat generated by the electricity generating cell unit 100 can be utilized as heat to vaporize water molecules which moves from the cathode gas humidifying fluid to the cathode gas in the cavities 281a through the hollow fiber membranes 281. Thus, heat can be exchanged efficiently between the upper fastening member 200 and the electricity generating cell unit 100. For the same reason, heat can be exchanged efficiently between the lower fastening member 300 and the electricity generating cell unit 100.

Further, heat of the electricity generating cell unit 100 is transmitted to the upper fastening member 200 and the lower fastening member 300, and the temperatures of the upper fastening member 200 and the lower fastening member 300 are varied in accordance with the temperature of the electricity generating cell unit 100. Therefore, since the temperature of water in the anode gas humidifying fluid flow-path 373 and water in the cathode gas humidifying fluid flow-path 273 are varied in accordance with the temperature of the electricity generating cell unit 100, humidified anode gas and cathode gas are not cooled in the electricity generating cell unit 100 and condensation is less prone to be generated.

Figure 14:
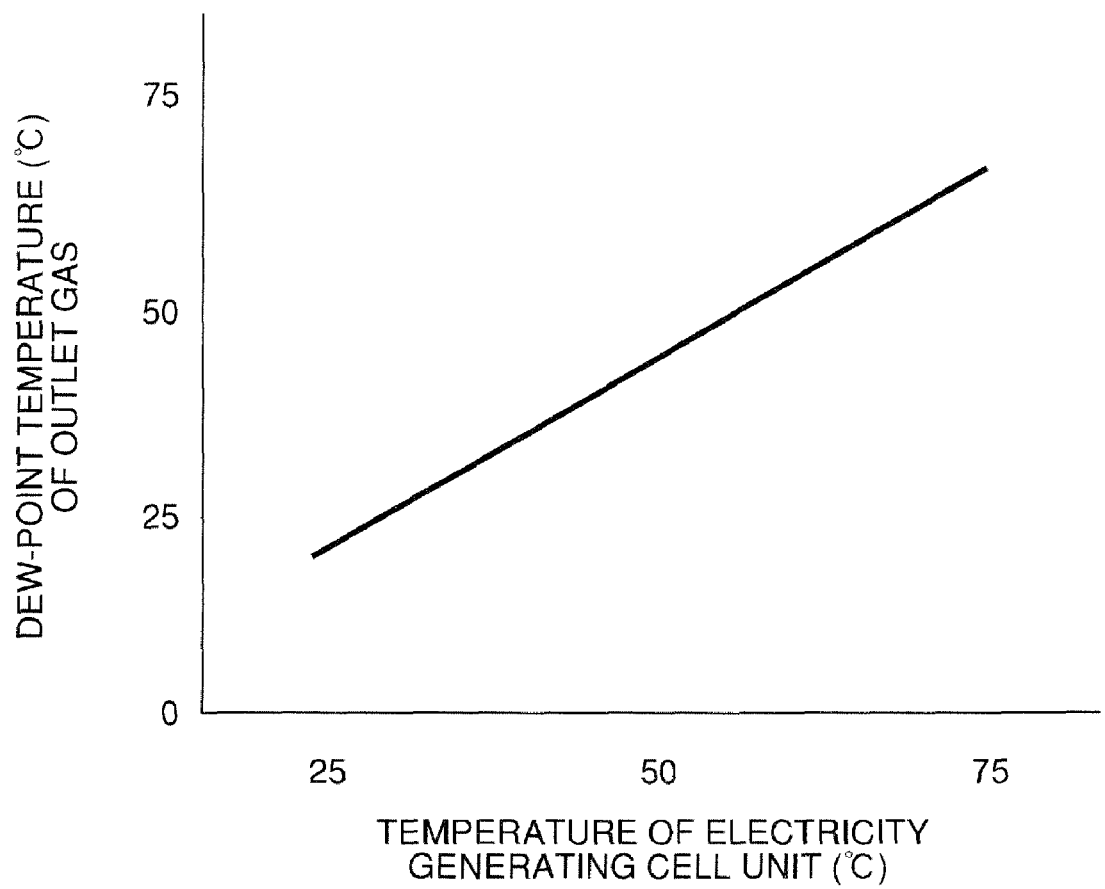
FIG. 14 is a graph showing a relationship between a temperature of the electricity generating cell unit 100 and a dew point temperature of outlet gas.

FIG. 14 is a graph showing a relationship between a temperature of the electricity generating cell unit 100 and a dew point temperature of anode gas or cathode gas (outlet gas) which has passed through the upper fastening member 200 or the lower fastening member 300. As shown in FIG. 14, the dew-point temperature of the outlet gas is lower than the temperature of the cell stack by several degrees C.

Since the temperatures of the upper fastening member 200 and the lower fastening member 300 are varied in accordance with the temperature of the electricity generating cell unit 100, a dew point temperature of the anode gas or cathode gas which has passed through the upper fastening member 200 and the lower fastening member 300 is kept lower than the temperature of the electricity generating cell unit 100. Thus, the anode gas and the cathode gas can appropriately be humidified without especially controlling the upper fastening member 200 and the lower fastening member 300.

Further, the upper fastening member 200 and the lower fastening member 300 are cooled by heat of vaporization of water molecules which moves from the cathode gas humidifying fluid to the cathode gas in the cavities 281a and 381a through the hollow fiber membranes 281 and 381, as well as by circulating anode gas humidifying fluid and cathode gas humidifying fluid. Thus, the electricity generating cell unit 100 can be cooled.

The humidified anode gas is supplied to the gas dispersion layer 22 from the meandering grooves 50a and 90a. Hydrogen gas (fuel gas) in the anode gas is separated into hydrogen ions and electrons by catalyst action (not shown) as shown in an electrochemical reaction equation (1). The hydrogen ions pass through the solid high polymer electrolyte film of the membrane electrode bonded body 21 and reach the gas dispersion layer 23.

$$H_2 \rightarrow 2H^+ + 2e^- \tag{1}$$

On the other hand, humidified cathode gas is supplied to the gas dispersion layer 23 from the meandering grooves 70b and 90b. Oxygen gas (oxidizing gas) in the cathode gas produces water together with hydrogen ions and electrons which have passed through the solid high polymer electrolyte film of the membrane electrode bonded body 21 by catalyst action (not shown) as shown in an electrochemical reaction equation (2).

$$2H^+ + \tfrac{1}{2}O_2 + 2e^- \rightarrow H_2O \tag{2}$$

Electrons are consumed by the gas dispersion layer 23, and electrons are produced by the gas dispersion layer 22. Therefore, a potential difference is generated between the two surfaces of the solid high polymer electrolyte film of the membrane electrode bonded body 21 and thus, electricity can be led out.

In the embodiment described above, the cathode gas is humidified by the upper fastening member 200, and the anode gas is humidified by the lower fastening member 300. Alternatively, it is possible to employ a flow-path structure in which only anode gas or only cathode gas is humidified by the two fastening members. When only one of the anode gas and the cathode gas is humidified by both of the two fastening members, two times flow rate can be handled at the maximum, or the capacity of each fastening member can be reduced by half, with respect to the embodiment described above.

In addition, in the embodiment described above, anode gas humidifying fluid and cathode gas humidifying fluid having a higher humidity than humidities of the anode gas and cathode gas flow through the anode gas humidifying fluid flow-path 373 and the cathode gas humidifying fluid flow-path 273. Alternatively, if fluid such as dry gas having a humidity lower than humidities of the anode gas and cathode gas is supplied, each of the upper fastening member 200 and the lower fastening member 300 can be used as a dryer (humidity changing device) of the anode gas or the cathode gas. For example, the operation temperature of the electricity generating cell unit 100 becomes relatively low in some cases depending upon a driving condition of the fuel cell device such as a case in which the fuel cell device is driven at lower output than that of the embodiment. In this case, there is a high possibility that condensation of the gases in the anode gas flow-path or cathode gas flow-path in the electricity generating cell unit 100 will occur. Therefore, in order to avoid condensation of these gases, it is preferable that at least one of the upper fastening member 200 and the lower fastening member 300 of the embodiment is used as a dryer.

Still further, in the embodiment described above, the bolts 404 to 409 are inserted through the upper fastening member 200 and the bolts 404 to 409 are threadedly engaged with the lower fastening member 300, thereby sandwiching the electricity generating cell unit 100 between the upper and lower fastening members 200 and 300. Instead of using the bolts 404 to 409, the upper fastening member 200 and the lower fastening member 300 may be connected to sandwich the electricity generating cell unit 100 by a band-like or cord member (not shown). Further, the cell stack 1 may be accommodated in a box (not shown) and the cell stack 1 may be fastened by a fastening member such as a screw (or screws) which is threadedly engaged with a wall surface of the box instead of using the bolts 404 to 409.

<Modification 1>

Figure 15:
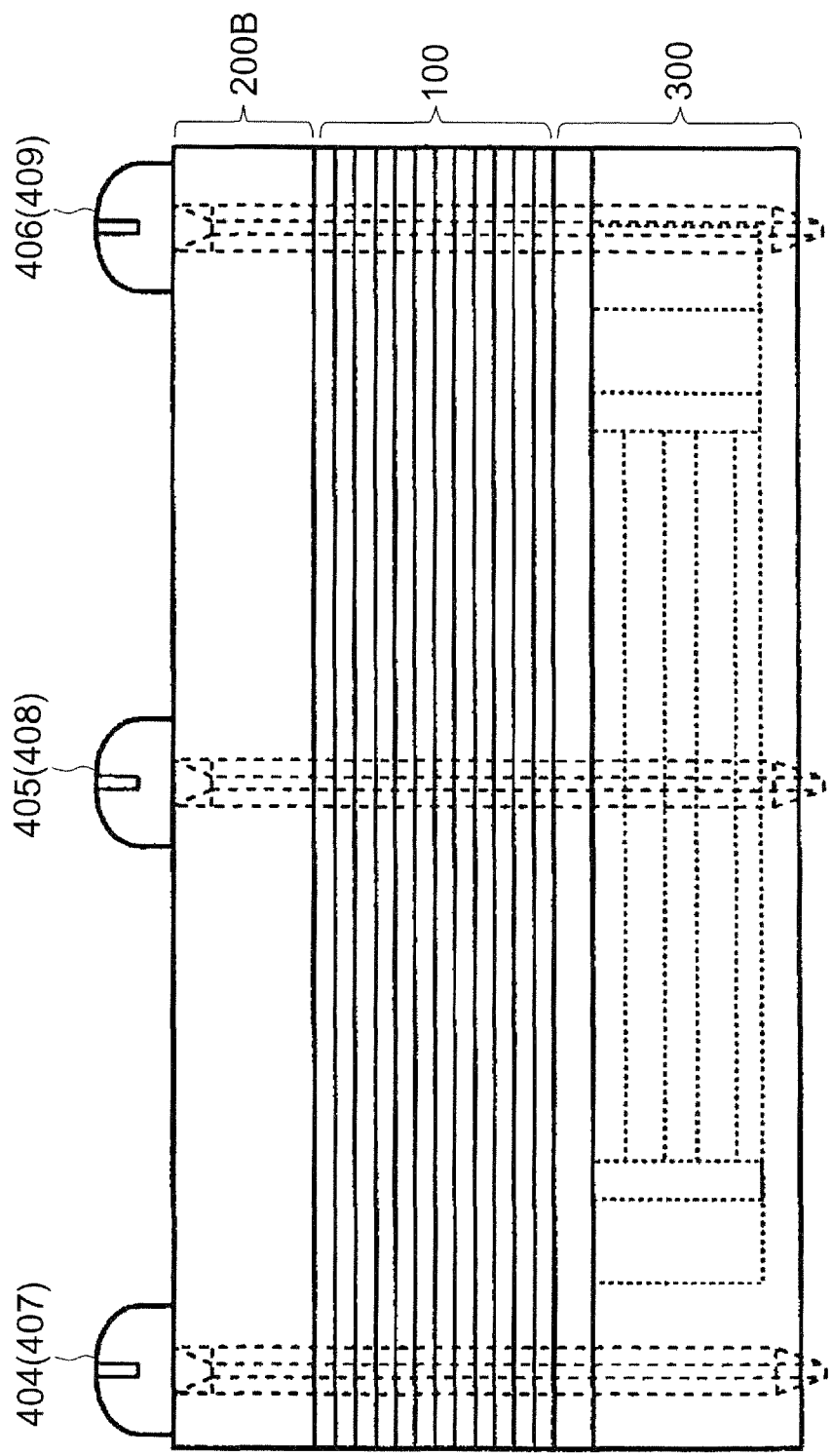
FIG. 15 is a front view of a cell stack 1B according to a modification.

FIG. 15 is a front view of a cell stack 1B according to a first modification of the first embodiment. When only anode gas is humidified and cathode gas is not humidified, as shown in FIG. 15, a fastening plate 200B is used instead of the upper fastening member 200, and the fastening plate 200B, the electricity generating cell unit 100 and the lower fastening member 300 may be fastened by the bolts 404 to 409. This configuration can also be employed when only cathode gas is humidified and anode gas is not humidified. If the fastening plate 200B is made of conductive material having high rigidity such as metal, the fastening plate 200B can function as a current collecting plate which leads out electric energy generated by the electricity generating cell unit 100. It is preferable that the thermal conductivity of the upper fastening member is high for the same reasons as explained above with respect to the first embodiment.

<Modification 2>

Figure 16:
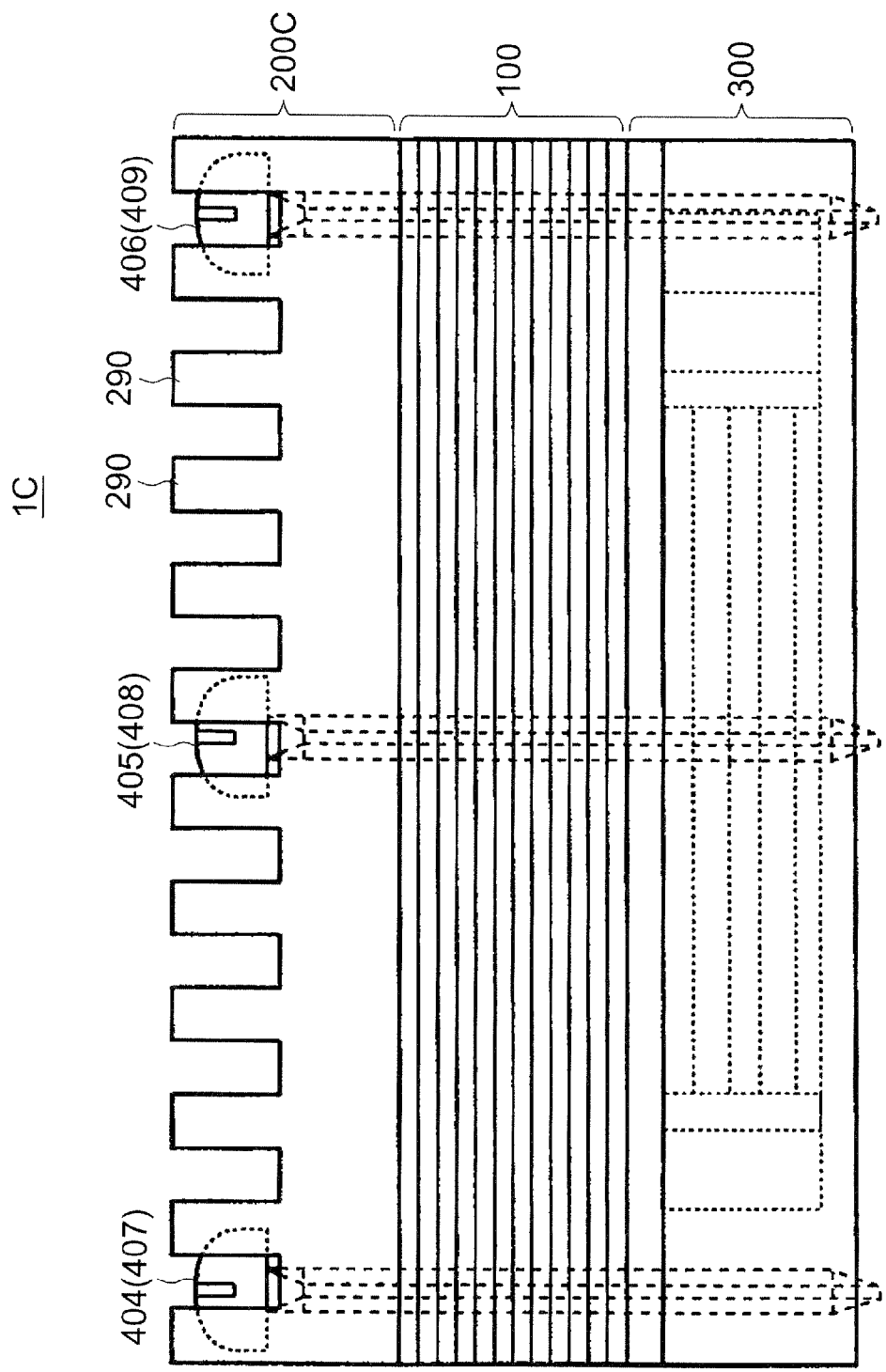
FIG. 16 is a front view of a cell stack 1C according to another modification.

FIG. 16 is a front view of a cell stack 1C according to a second modification of the first embodiment. As shown in FIG. 16, a fastening plate 200C provided at an upper portion thereof with an air-cooling fin 290 may be used instead of the upper fastening member 200, and the fastening plate 200C, the electricity generating cell unit 100 and the lower fastening member 300 may be fastened to each other by the bolts 404 to 409. If conductive material having high rigidity such as metal is used for the fastening plate 200C, the fastening plate 200C can function as a current collecting plate which leads out electric energy generated by the electricity generating cell unit 100. It is preferable that the thermal conductivity of the upper fastening member is high for the same reasons as explained above with respect to the first embodiment. Heat generated by the electricity generating cell unit 100 is dissipated outside through the air-cooling fin 290. The hollow fiber membrane module 280 may be provided in the plate 200C.

<Modification 3>

FIG. 17 is an exploded view of an upper fastening member 200D according to a third modification of the first embodiment. The upper fastening member 200D includes a lower container body 210D, an upper container body 240D and a hollow fiber membrane module 280D.

A recess 210d is formed in a central portion of an upper surface of the lower container body 210D. A recess 240d is formed in a central portion of a lower surface of the upper container body 240D. The hollow fiber membrane module 280D is accommodated in the recesses 210d and 240d when the lower container body 210D and the upper container body 240D are superposed on each other. The hollow fiber membrane module 280D is the same as the hollow fiber membrane module 280, and therefore an explanation thereof will be omitted.

The other structure of the upper fastening member 200D is the same as the structure of the upper fastening member 200, and therefore an explanation thereof will be omitted.

According to this modification of the first embodiment, lower container body 210D, which is thicker than the cover plate 210, is used instead of the cover plate 210. Accordingly, even if the entire upper fastening member 200D is reduced in thickness with respect to the upper fastening member 200, strength of the upper fastening member can be maintained, and it is possible to secure a sufficient thickness required for mounting the O-rings.

<Modification 4>

Figure 18A:
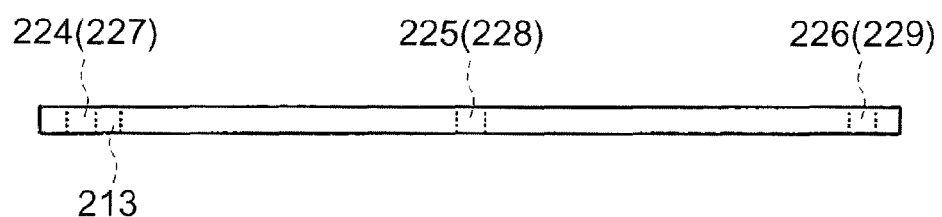
FIG. 18A is a side view of a cover plate 210E forming an upper fastening member 200E according to a further modification.
Figure 18B:
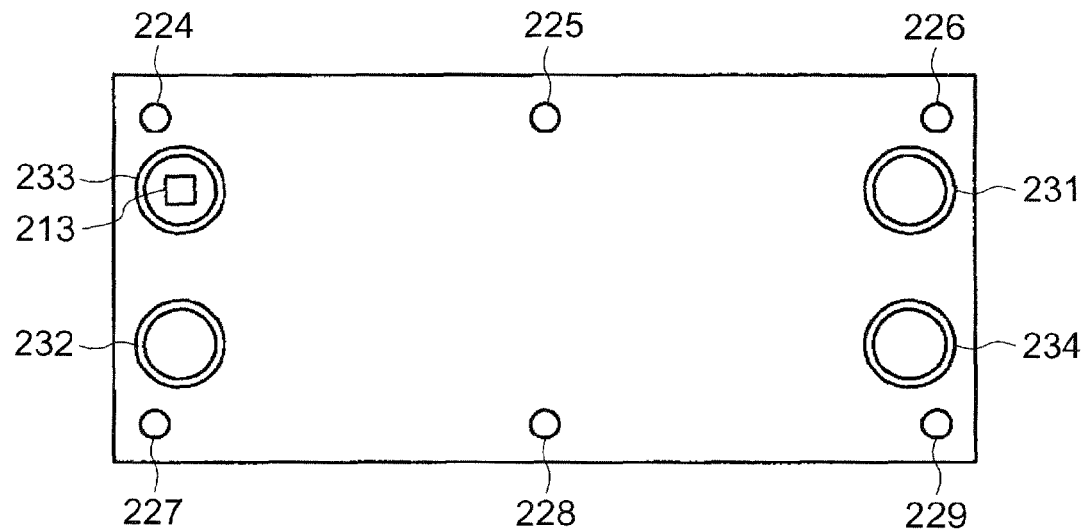
FIG. 18B is a bottom view of the cover plate 210E.
Figure 19A:
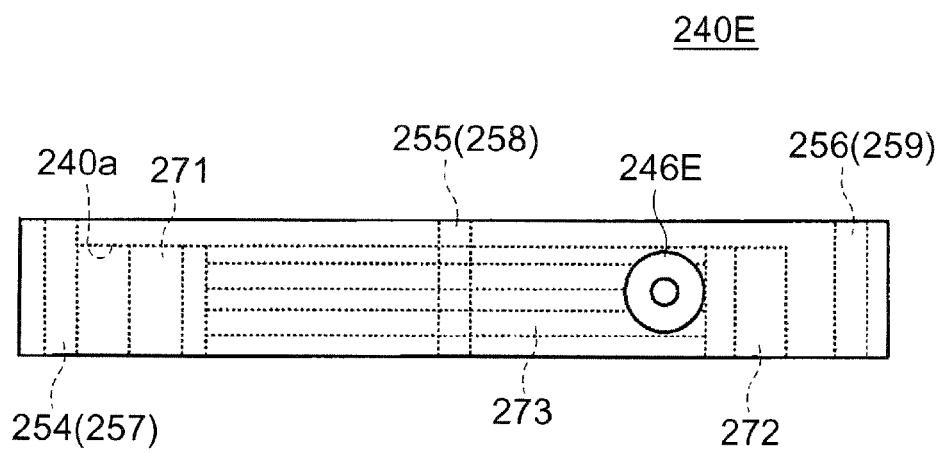
FIG. 19A is a side view of a container body 240E forming the upper fastening member 200E.
Figure 19B:
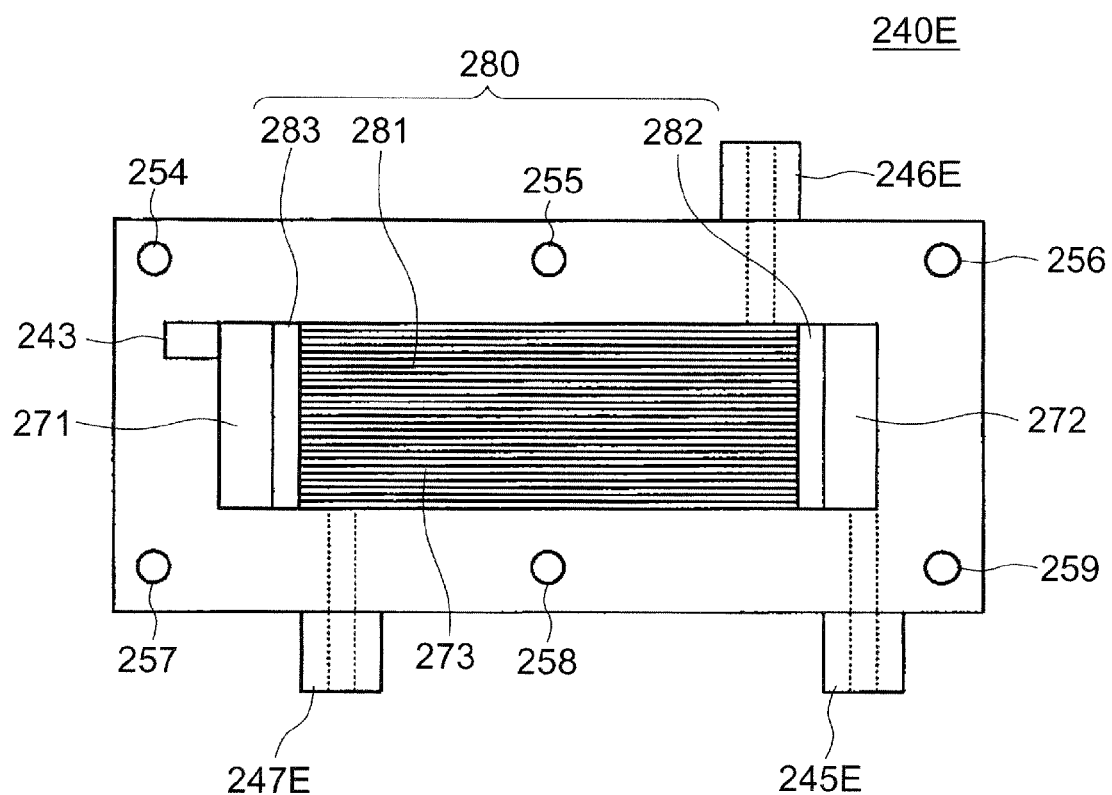
FIG. 19B is a bottom view of the container body 240E.

FIG. 18A is a side view of a cover plate 210E forming an upper fastening member 200E according to a fourth modification of the first embodiment, and FIG. 18B is a bottom view of the cover plate 210E. FIG. 19A is a side view of a container body 240E forming the upper fastening member 200E, and FIG. 19B is a bottom view of the container body 240E.

The cover plate 210E is different from the cover plate 210 in that the pre-humidification cathode gas supply hole 215, the cathode gas humidifying fluid supply hole 216 and the cathode gas humidifying fluid discharge hole 217 are not provided.

The container body 240E is different from the container body 240 in that a pre-humidification cathode gas supplying joint 245E, a cathode gas humidifying fluid supplying joint 246E and a cathode gas humidifying fluid discharging joint 247E are provided instead of the pre-humidification cathode gas supplying groove 245, the cathode gas humidifying fluid supplying groove 246 and the cathode gas humidifying fluid discharging groove 247. The pre-humidification cathode gas supplying joint 245E, the cathode gas humidifying fluid supplying joint 246E and the cathode gas humidifying fluid discharging joint 247E are connected to a pre-humidification cathode gas supplying pipe, a cathode gas humidifying fluid supplying pipe and a cathode gas humidifying fluid discharging pipe (not shown).

With this structure, it is possible to omit a supply flow-path for pre-humidification cathode gas, a supply flow-path for the cathode gas humidifying fluid and a discharge flow-path for the cathode gas humidifying fluid from the cell stack.

Second Embodiment

Next, a second embodiment of the present invention will be explained.

FIG. 20 is a front view of a cell stack 1F of the second embodiment. The cell stack 1F includes an electricity generating cell unit 100F, an upper fastening member 200F and a lower fastening member 300F which are the same as the electricity generating cell unit 100, the upper fastening member 200, and the lower fastening member 300 of the first embodiment, and also includes bolts 404F to 409F which are longer than the bolts 404 to 409 of the first embodiment, and nuts 414F to 419F. The cell stack 1F is mounted on a flow-path substrate (substrate) 500.

As shown in FIG. 20, in the cell stack 1F, the lower fastening member 300F, the electricity generating cell unit 100F and the upper fastening member 200F are piled on the flow-path substrate 500 in this order. The bolts 404F to 409F are inserted through the upper fastening member 200 and the electricity generating cell unit 100, and are threadedly engaged with the lower fastening member 300, and tip ends are inserted through holes (second through holes) 504 to 509 (see FIG. 21) formed in the flow-path substrate 500. The nuts 414F to 419F are threadedly engaged with the tip ends of the bolts 404F to 409F, and the flow-path substrate 500 is thereby fastened to a lower surface of the lower fastening member 300.

The flow-path substrate 500 is fixed by the bolts 404F to 409F. The flow-path substrate 500 does not have such a thickness along the longitudinal direction of the bolts 404F to 409F that the electricity generating cell unit 100 can be fastened in a hermetic state without threadedly engaging with the nuts 414F to 419F corresponding to the bolts 404F to 409F. Thus, in this embodiment, the nuts 414F to 419F are used for fastening the electricity generating cell unit 100F in a hermetic state.

[Flow-Path Substrate]

Figure 21:
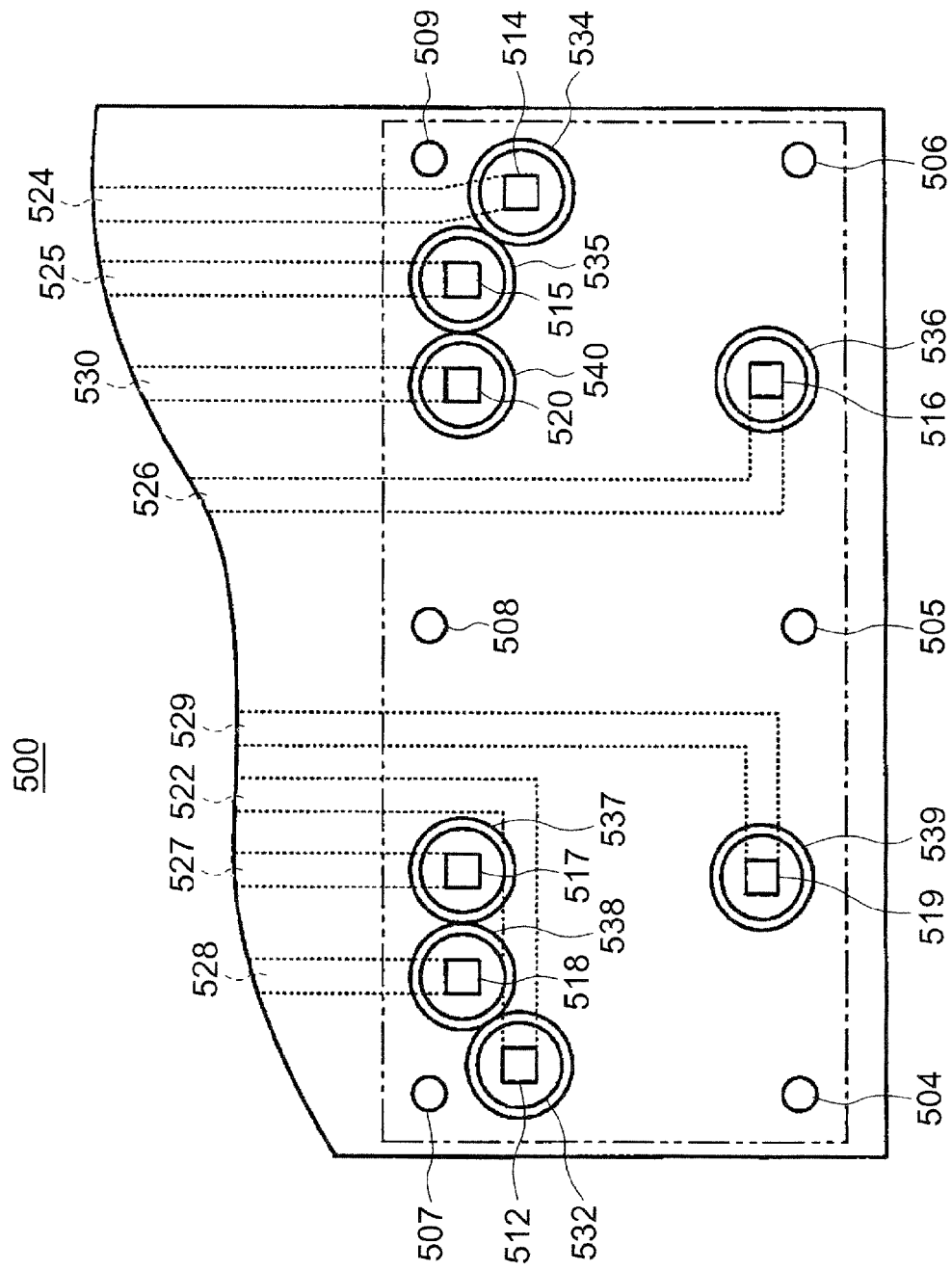
FIG. 21 is a plan view showing an abutment portion of a flow-path substrate 500 that abuts against the lower fastening member 300.

FIG. 21 is a plan view showing an abutment portion of a flow-path substrate 500 which abuts against the lower fastening member 300F. A portion surrounded by the phantom line is a portion corresponding to the lower fastening member 300F. As shown in FIG. 21, the flow-path substrate 500 is provided with screw holes 504 to 509 at locations corresponding to the screw holes 354 to 359 of the lower fastening member 300F.

An anode gas discharge hole 512, a cathode gas discharge hole 514, a pre-humidification cathode gas supply hole 515, a cathode gas humidifying fluid supply hole 516, a cathode gas humidifying fluid discharge hole 517, a pre-humidification anode gas supply hole 518, an anode gas humidifying fluid supply hole 519 and an anode gas humidifying fluid discharge hole 520 are provided at locations respectively corresponding to locations in the lower fastening member 300F of the anode gas discharge hole 342, the cathode gas discharge hole 344, the pre-humidification cathode gas supply hole 345, the cathode gas humidifying fluid supply hole 346, the cathode gas humidifying fluid discharge hole 347, the pre-humidification anode gas supply hole 348, the anode gas humidifying fluid supply hole 349 and the anode gas humidifying fluid discharge hole 350.

The anode gas discharge hole 512, the cathode gas discharge hole 514, the pre-humidification cathode gas supply hole 515, the cathode gas humidifying fluid supply hole 516, the cathode gas humidifying fluid discharge hole 517, the pre-humidification anode gas supply hole 518, the anode gas humidifying fluid supply hole 519 and the anode gas humidifying fluid discharge hole 520 are respectively in communication with an anode gas discharging flow-path 522, a cathode gas discharging flow-path 524, a pre-humidification cathode gas supplying flow-path 525, a cathode gas humidifying fluid supplying flow-path 526, a cathode gas humidifying fluid discharging flow-path 527, a pre-humidification anode gas supplying flow-path 528, a anode gas humidifying fluid supplying flow-path 529 and an anode gas humidifying fluid discharging flow-path 530 provided in the flow-path substrate 500. These flow-paths are connected to a reaction device 6 (described later) provided in the flow-path substrate 500 and an air pump (not shown).

O-rings 532, 534, 535, 536, 537, 538, 539 and 540 are provided on outer peripheries of the anode gas discharge hole 512, the cathode gas discharge hole 514, the pre-humidification cathode gas supply hole 515, the cathode gas humidifying fluid supply hole 516, the cathode gas humidifying fluid discharge hole 517, the pre-humidification anode gas supply hole 518, the anode gas humidifying fluid supply hole 519 and the anode gas humidifying fluid discharge hole 520, respectively. The O-rings 532, 534, 535, 536, 537, 538, 539 and 540 seal a gap between the lower fastening member 300F and the flow-path substrate 500.

[Fuel Cell Device]

Figure 22:
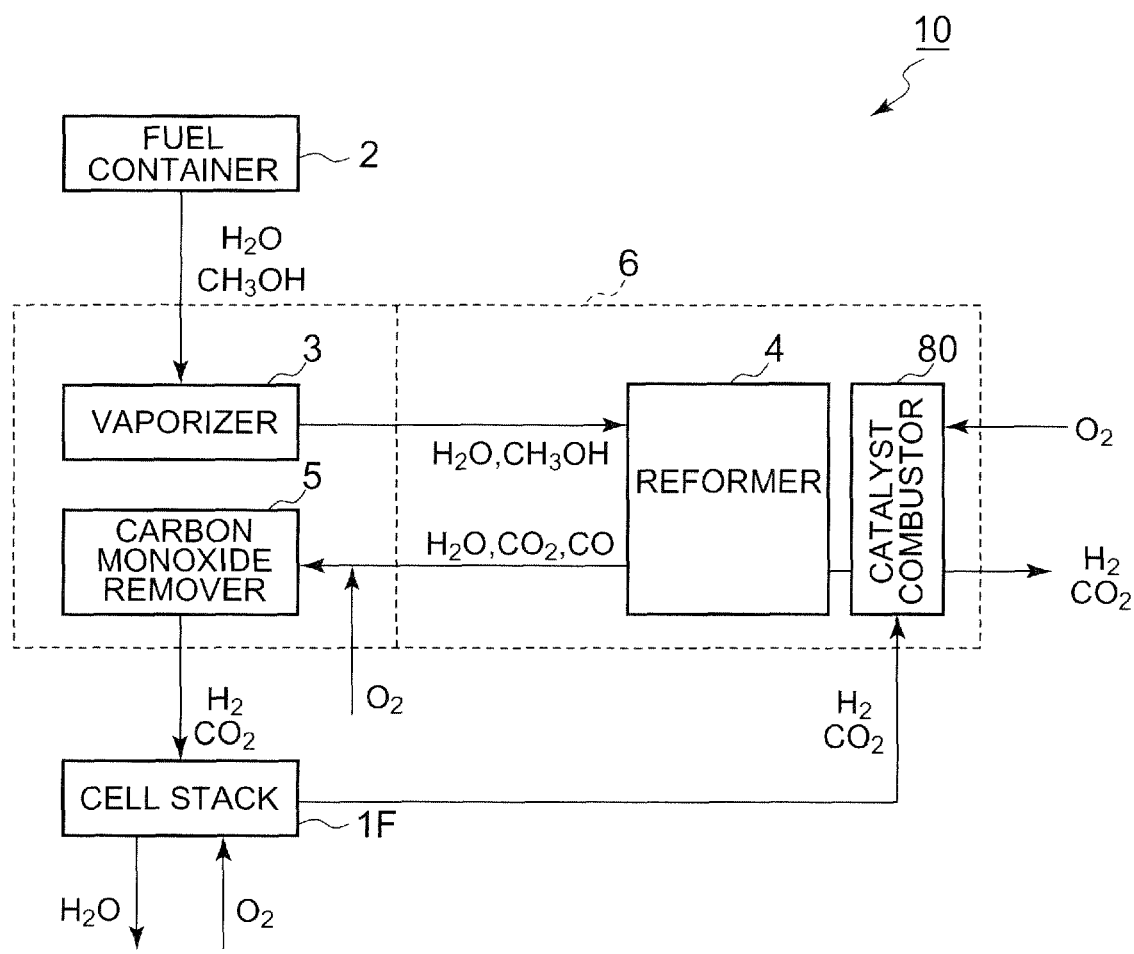
FIG. 22 is a block diagram of a fuel cell device 10.

FIG. 22 is a block diagram of a fuel cell device 10 to which the cell stack 1F of the second embodiment is preferably applied. The fuel cell device 10 can be provided in, for example, any of a notebook computer, a cellular phone, a PDA (Personal Digital Assistant), an electronic notepad, a watch, a digital still camera, a digital video camera, a game device, a game machine, an electronic calculator and other electronic devices. The fuel cell device 10 is used as a power supply for operating an electronic device main body.

The fuel cell device 10 includes the cell stack 1F, the fuel container 2 and the reaction device (fuel gas producing device) 6. Although it is not illustrated, the reaction device 6 is provided on the flow-path substrate 500, and the fuel container 2 is detachably attached to the flow-path substrate 500.

Fuel and water are stored in the fuel container 2, and the fuel container 2 supplies a liquid mixture of the fuel and water to the reaction device 6 by means of a micro pump (not shown). Carbon hydrogen liquid fuel can be stored in the fuel container 2 as fuel. Concrete examples of the fuel are alcohol such as methanol and ethanol, ether such as dimethyl ether, and gasoline. Fuel and water may be stored separately in the fuel container 2 but a mixture thereof may be stored.

Methanol is used as the fuel in the following explanation, but other compounds may be used.

The reaction device 6 includes a vaporizer 3, a reformer 4, a carbon monoxide remover 5, a catalyst combustor 80 and a heater (not shown). The vaporizer 3 vaporizes fuel and water supplied from the fuel container 2. The reformer 4 reforms vaporized fuel and vapor supplied from the vaporizer 3 by a reforming reaction by means of catalyst, and produces a gas mixture including hydrogen. When methanol is used as the fuel, hydrogen gas and carbon dioxide gas which are main products and a very small amount of carbon monoxide which is a by-product are produced by the reforming reaction shown in the following chemical reaction equations (3) and (4).

The carbon monoxide remover 5 oxidizes the carbon monoxide as shown in the chemical reaction equation (5), thereby removing the carbon monoxide from the gas mixture. More specifically, in addition to the gas mixture supplied from the reformer 4, air is supplied to the carbon monoxide remover 5. The carbon monoxide remover 5 selectively oxidizes and removes the carbon monoxide in the gas mixture by the carbon monoxide removing reaction shown in the chemical reaction equation (5) using a catalyst. The gas mixture from which carbon monoxide has been removed is used as the anode gas, and it is supplied to the pre-humidification anode gas supplying flow-path 528.

$$CH_3OH+H_2O \rightarrow 3H_2+CO_2 \quad (3)$$

$$2CH_3OH+H_2O \rightarrow 5H_2+CO+CO_2 \quad (4)$$

$$2CO+O_2 \rightarrow 2CO_2 \quad (5)$$

The catalyst combustor 80 and a heater (not shown) burn fuel and water supplied from the fuel container 2 or mix oxygen with OFF gas discharged from the anode gas discharging flow-path 522 and burn the same, heat the reformer 4 to 250° C. or higher, e.g., about 250 to 400° C., and heat the vaporizer 3 and the carbon monoxide remover 5 to about 110 to 190° C.

[Electronic Device]

Figure 23:
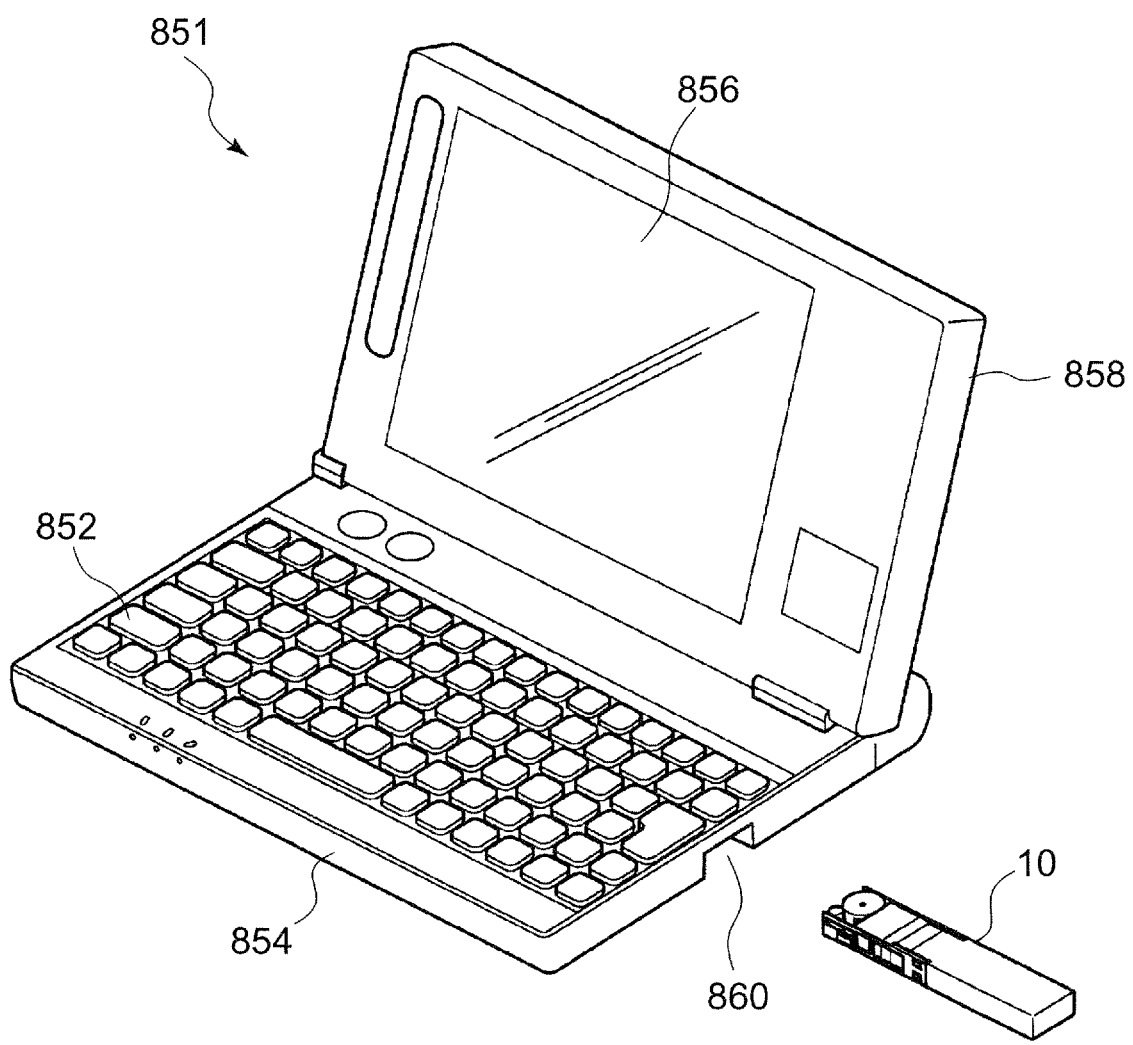
FIG. 23 is a perspective view of an electronic device 851 using the fuel cell device 10 as a power supply.

FIG. 23 is a perspective view of an electronic device 851 using the fuel cell device 10 as a power supply. As shown in FIG. 23, the electronic device 851 is a portable electronic device, and is a notebook computer for example. The electronic device 851 is an electronic device main body including a lower casing 854 and an upper casing 858. The lower casing 854 is provided therein with a calculation circuit comprising a CPU, a RAM, a ROM and other electronic parts, and is also provided with a keyboard 852. The upper casing 858 includes a liquid crystal display 856. The lower casing 854 and the upper casing 858 are coupled to each other through hinges, and the upper casing 858 can be superposed on the lower casing 854 so as to be folded into a state in which the keyboard 852 and the liquid crystal display 856 are opposed to each other. A mounting section 860 to which the fuel cell device 10 is to be mounted is formed from a right side surface to a bottom surface of the lower casing 854 of the electronic device main body. If the fuel cell device 10 is mounted to the mounting section 860, the electronic device main body of the electronic device 851 is operated by electricity generated by the fuel cell device 10.

Although various exemplary embodiments have been shown and described, the invention is not limited to the embodiments shown. Therefore, the scope of the invention is intended to be limited solely by the scope of the claims that follow.

What is claimed is:

1. A fastener, comprising:
   a pair of fastening members which sandwich an electricity generating cell therebetween;
   wherein at least one of the pair of fastening members has electrical conductivity, is connected to the electricity generating cell, and is provided with a humidity changing device which changes a humidity of gas to be supplied to the electricity generating cell;
   wherein current is collected using the at least one of the pair of the fastening members; and
   wherein the humidity changing device comprises:
      a hollow fiber membrane through an inside of which a first fluid for the gas to be supplied to the electricity generating cell flows, the hollow fiber membrane allowing a water molecule to move between the inside and outside of the hollow fiber membrane; and
      a casing having a flow-path through which a second fluid flows outside of the hollow fiber membrane, the second fluid being one of a gas having a humidity different from a humidity of the first fluid and a liquid including water.

2. The fastener according to claim 1, wherein the casing includes a container body provided with a recess in which the hollow fiber membrane is accommodated, and a lid body which covers an opening of the recess.

3. The fastener according to claim 1, wherein the casing includes two container bodies each provided with a recess, and the two container bodies are in tight contact with each other such that the respective recesses therein are opposed to each other to form a space to accommodate the hollow fiber membrane.

4. The fastener according to claim 1, wherein a first one of the pair of fastening members is provided with a plurality of through holes, and a second one of the pair of fastening members is provided with a plurality of threading holes respectively corresponding to the plurality of through holes provided in the first one of the pair of fastening members.

5. The fastener according to claim 1, further comprising an air-cooling fin.

6. A cell stack comprising:
   an electricity generating cell; and
   a pair of fastening members which sandwich the electricity generating cell therebetween;
   wherein at least one of the pair of fastening members has electrical conductivity, is provided with a humidity changing device which changes a humidity of a gas to be supplied to the electricity generating cell, and is connected to the electricity generating cell;
   wherein current is collected using the at least one of the pair of the fastening members; and
   wherein the humidity changing device comprises:
      a hollow fiber membrane through an inside of which a first fluid for the gas to be supplied to the electricity generating cell flows, the hollow fiber membrane allowing a water molecule to move between the inside and outside the hollow fiber membrane; and
      a casing having a flow-path through which a second fluid flows outside of the hollow fiber membrane, the second fluid being one of a gas having a humidity different from a humidity of the first fluid and a liquid including water.

7. The cell stack according to claim 6, wherein the casing includes a container body provided with a recess in which the hollow fiber membrane is accommodated, and a lid body which covers an opening of the recess.

8. The cell stack according to claim 6, wherein the casing includes two container bodies each provided with a recess, and the two container bodies are in tight contact with each other such that the respective recesses therein are opposed to each other to form a space to accommodate the hollow fiber membrane.

9. The cell stack according to claim 6, wherein the gas to be supplied to the electricity generating cell comprises a fuel gas to be supplied to an anode of the electricity generating cell.

10. The cell stack according to claim 6, wherein the gas to be supplied to the electricity generating cell comprises an oxidizing gas to be supplied to a cathode of the electricity generating cell.

11. The cell stack according to claim 6, wherein a first one of the pair of fastening members is provided with a plurality of through holes, and a second one of the pair of fastening members is provided with a plurality of threading holes which respectively correspond to the plurality of through holes provided in the first one of the pair of fastening members, the plurality of threading holes being provided with internal threads.

12. The cell stack according to claim 11, wherein the electricity generating cell is provided with a plurality of through holes which respectively correspond to both (i) the plurality of through holes of the first one of the pair of fastening members, and (ii) the plurality of threading holes of the second one of the pair of fastening members.

13. The cell stack according to claim 12, further comprising a plurality of bolts having external threads provided at respective first ends thereof so as to be threadedly engaged with the internal threads,
wherein the plurality of bolts pass through both (i) the plurality of through holes of the first one of the fastening members, and (ii) the plurality of through holes of the electricity generating cell, and
wherein the internal threads and the external threads are threadedly engaged in the plurality of threading holes, thereby sandwiching the electricity generating cell between the pair of fastening members.

14. The cell stack according to claim 11, further comprising:
a substrate provided with a plurality of through holes respectively corresponding to both (i) the plurality of through holes of the first one of the pair of fastening members, and (ii) the plurality of threading holes of the second one of the pair of fastening members;
a plurality of bolts which pass through the plurality of through holes of the substrate; and
a plurality of nuts respectively corresponding to the plurality of bolts, the plurality of nuts being threadedly engaged with the plurality of bolts on a side of the substrate opposite to a side of the substrate where the electricity generating cell is provided, thereby sandwiching the electricity generating cell between the pair of fastening members.

15. The cell stack according to claim 6, wherein the at least one of the fastening members includes a fin for radiating heat generated by the electricity generating cell.

16. A fuel cell device comprising:
the cell stack according to claim 6;
a fuel container in which fuel to be used in the electricity generating cell is stored; and
a fuel gas producing device which produces fuel gas from the fuel.

17. An electronic device comprising:
the fuel cell device according to claim 16, and
an electronic device main body to which the fuel cell device is attached.

18. A cell stack comprising:
an electricity generating cell; and
a pair of fastening members which sandwich the electricity generating cell therebetween;
wherein at least one of the pair of fastening members has electrical conductivity, and is connected to the electricity generating cell;
wherein current is collected using the at least one of the pair of the fastening members;
wherein a first one of the pair of fastening members is provided with a plurality of through holes, and a second one of the pair of fastening members is provided with a plurality of threading holes which respectively correspond to the plurality of through holes provided in the first one of the pair of fastening members, the plurality of threading holes being provided with internal threads; and
wherein the cell stack further comprises:
a substrate provided with a plurality of through holes respectively corresponding to both (i) the plurality of through holes of the first one of the pair of fastening members, and (ii) the plurality of threading holes of the second one of the pair of fastening members;
a plurality of bolts which pass through the plurality of through holes of the substrate; and
a plurality of nuts respectively corresponding to the plurality of bolts, the plurality of nuts being threadedly engaged with the plurality of bolts on a side of the substrate opposite to a side of the substrate where the electricity generating cell is provided, thereby sandwiching the electricity generating cell between the pair of fastening members.

19. The cell stack according to claim 18, wherein the electricity generating cell is provided with a plurality of through holes which respectively correspond to both (i) the plurality of through holes of the first one of the pair of fastening members, and (ii) the plurality of threading holes of the second one of the pair of fastening members.

20. The cell stack according to claim 19, wherein external threads are provided at respective first ends of the plurality of bolts so as to be threadedly engaged with the internal threads; and
wherein the plurality of bolts pass through both (i) the plurality of through holes of the first one of the fastening members, and (ii) the plurality of through holes of the electricity generating cell; and
wherein the internal threads and the external threads are threadedly engaged in the plurality of threading holes, thereby sandwiching the electricity generating cell between the pair of fastening members.

21. The cell stack according to claim 18, wherein the at least one of the fastening members includes a fin for radiating heat generated by the electricity generating cell.

* * * * *